(12) United States Patent
Cheng et al.

(10) Patent No.: US 11,533,603 B2
(45) Date of Patent: Dec. 20, 2022

(54) POWER SAVING FOR PEDESTRIAN USER EQUIPMENTS

(71) Applicant: QUALCOMM Incorporated, San Diego, CA (US)

(72) Inventors: Hong Cheng, Basking Ridge, NJ (US); Kapil Gulati, Belle Mead, NJ (US); Junyi Li, Chester, NJ (US); Sudhir Kumar Baghel, Hillsborough, NJ (US); Dan Vassilovski, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 17/066,366

(22) Filed: Oct. 8, 2020

(65) Prior Publication Data
US 2021/0112396 A1    Apr. 15, 2021

Related U.S. Application Data

(60) Provisional application No. 62/914,878, filed on Oct. 14, 2019.

(51) Int. Cl.
*H04W 8/00* (2009.01)
*H04W 4/40* (2018.01)
(Continued)

(52) U.S. Cl.
CPC .......... *H04W 8/005* (2013.01); *H04W 4/40* (2018.02); *H04W 8/24* (2013.01); *H04W 24/08* (2013.01);
(Continued)

(58) Field of Classification Search
CPC ....... H04W 8/005; H04W 8/24; H04W 76/28; H04W 76/11; H04W 4/40; H04W 24/08; H04W 72/1257
(Continued)

(56) References Cited

U.S. PATENT DOCUMENTS

2002/0039420 A1* 4/2002 Shacham .............. H04L 9/0841
713/151
2016/0021526 A1* 1/2016 Niu ..................... H04L 61/2575
370/230
(Continued)

FOREIGN PATENT DOCUMENTS

| EP | 2728950 A2 | 5/2014 |
|---|---|---|
| WO | WO-2017135028 A1 | 8/2017 |
| WO | WO-2019133048 A1 | 7/2019 |

OTHER PUBLICATIONS

International Search Report and Written Opinion—PCT/US2020/055114—ISA/EPO—dated Jan. 19, 2021.

*Primary Examiner* — Mong-Thuy T Tran
(74) *Attorney, Agent, or Firm* — Shankar Krithivasan

(57) ABSTRACT

Methods, systems, and devices for wireless communications are described. A first user equipment (UE), such as a pedestrian UE, may perform a discovery procedure with a second UE in a vehicle-to-everything (V2X) wireless communications environment that includes multiple other UEs in addition to the first UE and the second UE. The second UE may, for example, be a roadside UE configured to aggregate V2X messages for the first UE. The first UE may determine, based on performing the discovery procedure, a schedule for the first UE to use to receive bundled V2X messages from the second UE. The first UE may receive, from the second UE based on the determined schedule, a message indicating bundled information from multiple V2X messages received at the second UE from the multiple UEs.

30 Claims, 13 Drawing Sheets

(51) Int. Cl.
  *H04W 24/08*  (2009.01)
  *H04W 72/12*  (2009.01)
  *H04W 76/11*  (2018.01)
  *H04W 76/28*  (2018.01)
  *H04W 8/24*   (2009.01)

(52) U.S. Cl.
  CPC ........ *H04W 72/1257* (2013.01); *H04W 76/11* (2018.02); *H04W 76/28* (2018.02)

(58) Field of Classification Search
  USPC ......................................................... 370/329
  See application file for complete search history.

(56) References Cited

U.S. PATENT DOCUMENTS

| | | | |
|---|---|---|---|
| 2016/0105889 A1* | 4/2016 | Jamal-Syed | H04W 4/70 370/329 |
| 2017/0330457 A1 | 11/2017 | Bhalla | |
| 2018/0103427 A1* | 4/2018 | Griot | H04W 52/0225 |
| 2018/0376304 A1* | 12/2018 | Cheng | H04W 4/40 |
| 2019/0116475 A1* | 4/2019 | Lee | H04W 74/0808 |
| 2019/0132709 A1 | 5/2019 | Graefe et al. | |
| 2019/0149279 A1* | 5/2019 | Lee | H04L 1/1822 370/329 |
| 2019/0306678 A1* | 10/2019 | Byun | H04W 72/0446 |
| 2020/0107354 A1* | 4/2020 | Chen | H04W 28/26 |
| 2020/0196321 A1* | 6/2020 | Zhang | G08G 1/005 |
| 2021/0219268 A1* | 7/2021 | Li | H04W 72/02 |
| 2021/0258764 A1* | 8/2021 | Zhang | H04W 8/005 |
| 2021/0306824 A1* | 9/2021 | Li | H04W 72/1263 |

* cited by examiner

POWER SAVING FOR PEDESTRIAN USER EQUIPMENTS

CROSS REFERENCE

The present application for patent claims the benefit of U.S. Provisional Patent Application No. 62/914,878 by CHENG et al., entitled "POWER SAVING FOR PEDESTRIAN USER EQUIPMENTS," filed Oct. 14, 2019, assigned to the assignee hereof, and expressly incorporated by reference herein.

BACKGROUND

The following relates generally to wireless communications, and more specifically to power saving for pedestrian user equipments (UEs).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as a UE.

In some wireless communications systems, such as vehicle-to-everything (V2X) communications systems, a UE may receive messages from multiple devices. Techniques for receiving these messages may be improved.

SUMMARY

The described techniques relate to improved methods, systems, devices, and apparatuses that support power saving for pedestrian user equipments (UEs). Generally, the described techniques provide for bundling vehicle-to-everything (V2X) messages for a pedestrian UE (P-UE). A V2X wireless communications environment may include multiple types of wireless communications devices. For example, the V2X environment may include UEs, such as P-UEs, UEs integrated into vehicles (e.g., V-UEs), and base stations. A P-UE may monitor for V2X messages from other devices in the V2X wireless communications environment, which may indicate warnings, environment information, etc. A V2X wireless communications system described herein may support bundling V2X messages from multiple V2X devices, such that a P-UE receives a single transmission for the V2X messages instead of multiple, separate V2X messages.

In some cases, a roadside unit (RSU) may be an example of a UE which aggregates V2X messages from other devices and transmits a message indicating the aggregated messages to a P-UE. In some cases, the message may include the aggregated V2X messages. In some cases, the message may be based on the aggregated V2X messages, for example by including some information (e.g., high priority information) but not all of the contents of the aggregated V2X messages. The RSU and the P-UE may determine a schedule for the P-UE to receive the message from the RSU, and the RSU may transmit a message based on a bundled V2X message to the P-UE according to the schedule. "Bundled" or "bundling" may also be referred to interchangeably as "aggregated" or "aggregating" herein, for example "bundled V2X messages" may also be referred to as "aggregated V2X messages." Techniques for a P-UE to discover the RSU are described herein. For example, RSU discovery may be based on announcements (e.g., presence announcements) transmitted by the RSU or based on announcements transmitted by the P-UE. In some examples, once it has determined that the RSU can transmit indications of the bundled or aggregated messages to the P-UE based on the discovery procedure, the P-UE may enter a low power mode until a time period to receive an bundled or aggregated V2X message, when the P-UE may enter a higher power mode.

A method of wireless communications at a first UE is described. The method may include performing, with a second UE, a discovery procedure in a vehicle-to-everything wireless communications environment that includes a set of UEs in addition to the first UE and the second UE, determining, based on performing the discovery procedure, a schedule for the first UE to use to receive aggregated vehicle-to-everything messages from the second UE, and receiving, from the second UE based on the determined schedule, a message indicating aggregated information from a set of vehicle-to-everything messages received at the second UE from the set of UEs.

An apparatus for wireless communications at a first UE is described. The apparatus may include a processor, memory coupled with the processor, and instructions stored in the memory. The instructions may be executable by the processor to cause the apparatus to perform, with a second UE, a discovery procedure in a vehicle-to-everything wireless communications environment that includes a set of UEs in addition to the first UE and the second UE, determine, based on performing the discovery procedure, a schedule for the first UE to use to receive aggregated vehicle-to-everything messages from the second UE, and receive, from the second UE based on the determined schedule, a message indicating aggregated information from a set of vehicle-to-everything messages received at the second UE from the set of UEs.

Another apparatus for wireless communications at a first UE is described. The apparatus may include means for performing, with a second UE, a discovery procedure in a vehicle-to-everything wireless communications environment that includes a set of UEs in addition to the first UE and the second UE, determining, based on performing the discovery procedure, a schedule for the first UE to use to receive aggregated vehicle-to-everything messages from the second UE, and receiving, from the second UE based on the determined schedule, a message indicating aggregated information from a set of vehicle-to-everything messages received at the second UE from the set of UEs.

A non-transitory computer-readable medium storing code for wireless communications at a first UE is described. The code may include instructions executable by a processor to perform, with a second UE, a discovery procedure in a vehicle-to-everything wireless communications environment that includes a set of UEs in addition to the first UE and the second UE, determine, based on performing the discovery procedure, a schedule for the first UE to use to receive aggregated vehicle-to-everything messages from the second UE, and receive, from the second UE based on the determined schedule, a message indicating aggregated information from a set of vehicle-to-everything messages received at the second UE from the set of UEs.

In some examples of the method, apparatuses, and non-transitory computer-readable medium described herein, receiving the message indicating the aggregated information from the set of vehicle-to-everything messages may include operations, features, means, or instructions for receiving, from the second UE, a notification of the aggregated information, where the second UE may have processed the set of vehicle-to-everything messages to generate the aggregated information of the notification.

In some examples of the method, apparatuses, and non-transitory computer-readable medium described herein, receiving the message indicating the aggregated information from the set of vehicle-to-everything messages may include operations, features, means, or instructions for receiving the message from the second UE, the message including an aggregation of the set of vehicle-to-everything messages.

In some examples of the method, apparatuses, and non-transitory computer-readable medium described herein, performing the discovery procedure with the second UE may include operations, features, means, or instructions for receiving, on a discovery channel, an announcement indicating discovery information for the second UE, and transmitting, to the second UE, a request to associate with the second UE based on the received announcement.

Some examples of the method, apparatuses, and non-transitory computer-readable medium described herein may further include operations, features, means, or instructions for entering, from a first mode, a second mode based on having determined the schedule, the second mode associated with a lower power than the first mode.

Some examples of the method, apparatuses, and non-transitory computer-readable medium described herein may further include operations, features, means, or instructions for monitoring the discovery channel according to resources dedicated for discovering UEs capable of bundling vehicle-to-everything messages, the announcement received based on the monitoring.

In some examples of the method, apparatuses, and non-transitory computer-readable medium described herein, the announcement includes, for the second UE, an identifier, a permanency status, a position identifier, a transmission schedule, a transmission capability, at least one connection establishment setting, or a combination thereof.

In some examples of the method, apparatuses, and non-transitory computer-readable medium described herein, performing the discovery procedure with the second UE may include operations, features, means, or instructions for transmitting an announcement indicating the schedule that the first UE may be to use to receive aggregated vehicle-to-everything messages, and receiving, from the second UE at least in part in response to the transmitted announcement, a signal indicating that the second UE will associate with the first UE.

In some examples of the method, apparatuses, and non-transitory computer-readable medium described herein, the announcement includes, for the first UE, an identifier, a speed, a direction, a projected path, an indicator of the schedule, or a combination thereof.

Some examples of the method, apparatuses, and non-transitory computer-readable medium described herein may further include operations, features, means, or instructions for receiving vehicle-to-everything messages from at least one of the set of UEs while operating according to a first mode, and entering a second mode based on performing the discovery procedure, the second mode associated with a lower power than the first mode.

In some examples of the method, apparatuses, and non-transitory computer-readable medium described herein, performing the discovery procedure with the second UE further may include operations, features, means, or instructions for determining a set of UEs capable of bundling vehicle-to-everything messages from the first UE, and selecting the second UE from the set of UEs.

In some examples of the method, apparatuses, and non-transitory computer-readable medium described herein, performing the discovery procedure further may include operations, features, means, or instructions for identifying a set of resources, including at least a transmission cycle, for discovering UEs capable of bundling vehicle-to-everything messages, and entering, from a first mode, a second mode to monitor for discovery signal of the discovery procedure on the set of resources according to the transmission cycle.

Some examples of the method, apparatuses, and non-transitory computer-readable medium described herein may further include operations, features, means, or instructions for broadcasting a discontinuous reception schedule for the first UE, where the message indicating the aggregated information may be received during an awake cycle of the discontinuous reception schedule in response to the broadcast discontinuous reception schedule.

In some examples of the method, apparatuses, and non-transitory computer-readable medium described herein, determining the schedule may include operations, features, means, or instructions for receiving an indication of the schedule from the second UE.

In some examples of the method, apparatuses, and non-transitory computer-readable medium described herein, the message indicating the aggregated information may be unicast or groupcast.

A method of wireless communications with a first UE at a second UE is described. The method may include performing, with the first UE, a discovery procedure in a vehicle-to-everything wireless communications environment that includes a set of UEs in addition to the first UE and the second UE, determining, based on performing the discovery procedure, a schedule for the first UE to use to receive aggregated vehicle-to-everything messages, receiving a set of vehicle-to-everything messages from the set of UEs, and transmitting, to the second UE according to the determined schedule, a message indicating aggregated information from the set of vehicle-to-everything messages.

An apparatus for wireless communications with a first UE at a second UE is described. The apparatus may include a processor, memory coupled with the processor, and instructions stored in the memory. The instructions may be executable by the processor to cause the apparatus to perform, with the first UE, a discovery procedure in a vehicle-to-everything wireless communications environment that includes a set of UEs in addition to the first UE and the second UE, determine, based on performing the discovery procedure, a schedule for the first UE to use to receive aggregated vehicle-to-everything messages, receive a set of vehicle-to-everything messages from the set of UEs, and transmit, to the second UE according to the determined schedule, a message indicating aggregated information from the set of vehicle-to-everything messages.

Another apparatus for wireless communications with a first UE at a second UE is described. The apparatus may include means for performing, with the first UE, a discovery procedure in a vehicle-to-everything wireless communications environment that includes a set of UEs in addition to the first UE and the second UE, determining, based on performing the discovery procedure, a schedule for the first UE to use to receive aggregated vehicle-to-everything messages, receiving a set of vehicle-to-everything messages from the set of UEs, and transmitting, to the second UE according to the determined schedule, a message indicating aggregated information from the set of vehicle-to-everything messages.

A non-transitory computer-readable medium storing code for wireless communications with a first UE at a second UE is described. The code may include instructions executable by a processor to perform, with the first UE, a discovery procedure in a vehicle-to-everything wireless communications environment that includes a set of UEs in addition to the first UE and the second UE, determine, based on performing the discovery procedure, a schedule for the first UE to use to receive aggregated vehicle-to-everything messages, receive a set of vehicle-to-everything messages from the set of UEs, and transmit, to the second UE according to the determined schedule, a message indicating aggregated information from the set of vehicle-to-everything messages.

Some examples of the method, apparatuses, and non-transitory computer-readable medium described herein may further include operations, features, means, or instructions for processing the set of vehicle-to-everything messages to generate the aggregated information of a notification, where transmitting the message includes indicating the aggregated information from the set of vehicle-to-everything messages.

Some examples of the method, apparatuses, and non-transitory computer-readable medium described herein may further include operations, features, means, or instructions for aggregating the set of vehicle-to-everything messages, and transmitting, to the first UE, the message including the aggregation of the set of vehicle-to-everything messages.

In some examples of the method, apparatuses, and non-transitory computer-readable medium described herein, performing the discovery procedure with the first UE may include operations, features, means, or instructions for transmitting, on a discovery channel, an announcement indicating discovery information for the second UE, and receiving, from the first UE, a request to associate with the second UE at least in part in response to the transmitted announcement.

In some examples of the method, apparatuses, and non-transitory computer-readable medium described herein, the announcement includes, for the second UE, an identifier, a permanency status, a position identifier, a transmission schedule, a transmission capability, at least one connection establishment setting, or a combination thereof.

In some examples of the method, apparatuses, and non-transitory computer-readable medium described herein, performing the discovery procedure with the first UE may include operations, features, means, or instructions for receiving an announcement indicating the schedule that the first UE may be to use to receive aggregated vehicle-to-everything messages, and transmitting, to the second UE in response to the received announcement, a signal indicating that the second UE will associate with the first UE.

In some examples of the method, apparatuses, and non-transitory computer-readable medium described herein, the announcement includes, for the first UE, an identifier, a speed, a direction, a projected path, an indicator of the schedule, or a combination thereof.

Some examples of the method, apparatuses, and non-transitory computer-readable medium described herein may further include operations, features, means, or instructions for transmitting, to the second UE, an indication of the schedule.

In some examples of the method, apparatuses, and non-transitory computer-readable medium described herein, the message indicating the aggregated information may be unicast or groupcast.

Some examples of the method, apparatuses, and non-transitory computer-readable medium described herein may further include operations, features, means, or instructions for identifying an absence of UEs having a capability to bundle vehicle-to-everything messages from the set of UEs, and determining for the second UE to perform bundling of vehicle-to-everything messages for the set of UEs based on the identifying.

In some examples of the method, apparatuses, and non-transitory computer-readable medium described herein, the second UE is included at a base station.

Some examples of the method, apparatuses, and non-transitory computer-readable medium described herein may further include operations, features, means, or instructions for determining environment information for the second UE using at least one sensor of the second UE, the transmitted message indicating the aggregated information from the set of vehicle-to-everything messages and the environment information.

DETAILED DESCRIPTION

Figure 1:
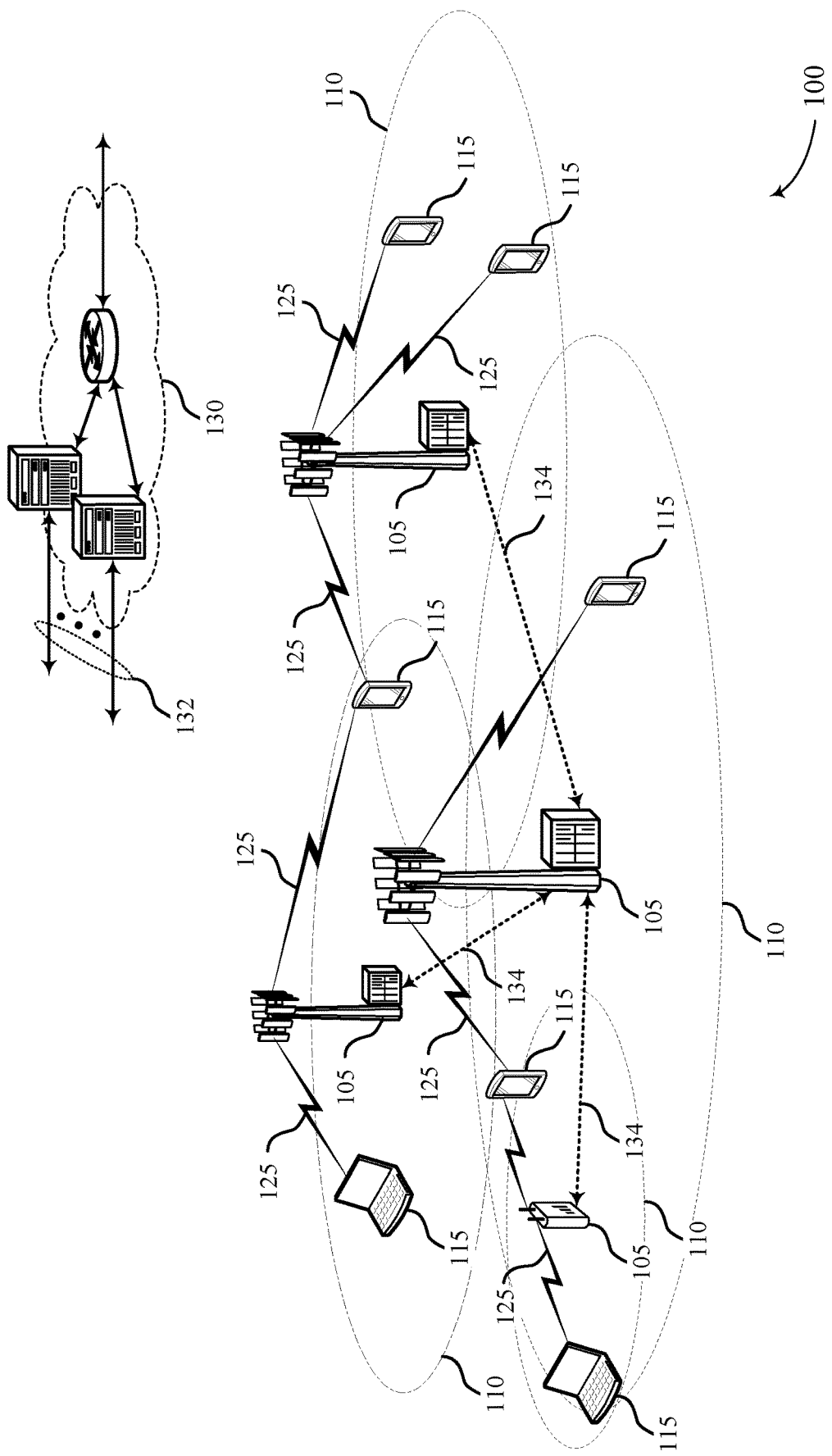
FIG. 1 illustrates an example of a system for wireless communications that supports power saving for pedestrian user equipments (UEs) in accordance with aspects of the present disclosure.

A vehicle-to-everything (V2X) wireless communications environment may include multiple types of wireless communications devices. For example, the V2X environment may include user equipments (UEs), such as pedestrian UEs (P-UEs), UEs integrated into vehicles (e.g., V-UEs), and base stations. A P-UE may monitor for V2X messages from other devices in the V2X wireless communications environment. In an example, if the P-UE is approaching a busy intersection and one of the V2X devices detects a possible collision, the P-UE may receive a warning of the possible collision. A user facilitating the P-UE may then act to avoid the possible collision. V2X devices may identify environment information (e.g., V2X device locations, trajectories, etc.) and information for the P-UE (e.g., speed, direction, and location) and transmit V2X messages to the P-UE accordingly.

In some conventional V2X systems, a P-UE may receive V2X messages from multiple V2X devices. For example, in a V2X system with multiple V-UEs, the P-UE may monitor for V2X messages from each of the multiple V-UEs. This may consume a lot of power at the P-UE, as the P-UE may continuously monitor for V2X messages in case of any urgent alerts or warnings. The P-UE of these systems may be prevented from going into a low power state.

Wireless communications systems described herein support techniques for enhanced power savings for P-UEs. For example, some V2X wireless communications systems described herein may support bundling V2X messages from multiple V2X devices at a UE and having the UE transmit a message indicating the bundled V2X message to a P-UE. "Bundled" or "bundling" may also be referred to interchangeably as "aggregated" or "aggregating" herein, for example "bundled V2X messages" may also be referred to as "aggregated V2X messages." The P-UE may then receive a single transmission from a single device instead of monitoring for multiple V2X messages from multiple V2X devices. In some cases, a roadside unit (RSU) may be an example of a UE which aggregates V2X messages from other devices and transmits the message indicating the bundled or aggregated messages to a P-UE. The RSU and the P-UE may determine a schedule for the P-UE to receive the message from the RSU, and the RSU may transmit a message based on bundled or aggregated V2X message to the P-UE according to the schedule. Techniques for a P-UE to discover the RSU are described herein. For example, RSU discovery may be based on announcements (e.g., presence announcements) transmitted by the RSU or based on announcements transmitted by the P-UE. Once determined that the RSU can transmit indications of the bundled or aggregated messages to the P-UE based on the discovery procedure, the P-UE may enter a low power mode.

Aspects of the disclosure are initially described in the context of a wireless communications system. Aspects of the disclosure are further illustrated by and described with reference to apparatus diagrams, system diagrams, and flowcharts that relate to power saving for pedestrian UEs.

FIG. 1 illustrates an example of a wireless communications system 100 that supports power saving for pedestrian UEs in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARD) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f=307,200$ $T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are bundled or aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that support simultaneous communications via carriers associated with more than one different carrier bandwidth.

Wireless communications system 100 may support communication with a UE 115 on multiple cells or carriers, a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other component carriers, which may include use of a reduced symbol duration as compared with symbol durations of the other component carriers. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications system 100 may be an NR system that may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

The wireless communications system 100 may support bundling V2X messages for a pedestrian UE. A V2X wireless communications environment, such as the wireless communications system 100, may include multiple types of wireless communications devices. For example, the V2X environment may include P-UEs 115, V-UEs, base stations 105, and other types of devices. A P-UE 115 may monitor for V2X messages from other devices in the wireless communications system 100, which may indicate warnings, environment information, etc. The wireless communications system 100 may support bundling V2X messages from multiple V2X devices, such that a P-UE 115 receives a single transmission for the V2X messages instead of multiple, separate V2X messages multiple V2X devices.

In some cases, an RSU may be an example of a UE 115 which aggregates V2X messages from other devices and transmits a message indicating the bundled or aggregated messages to a P-UE 115. In some cases, the message may include all of the bundled or aggregated V2X messages. In some cases, the message may be based on the bundled or aggregated V2X messages, for example by including some information (e.g., high priority information) but not all of the contents of the bundled or aggregated V2X messages. The RSU and the P-UE 115 may determine a schedule for the P-UE 115 to receive the message from the RSU, and the RSU may transmit a message based on the bundled or aggregated V2X message to the P-UE 115 according to the schedule. Techniques for a P-UE to discover the RSU are described herein. For example, RSU discovery may be based on announcements (e.g., presence announcements) transmitted by the RSU (e.g., for the P-UE to discover the RSU) or based on announcements transmitted by the P-UE 115 (e.g., for the RSU to discover the P-UE). Once determined that the RSU can transmit indications of the bundled or aggregated messages to the P-UE 115 based on the discovery procedure, the P-UE 115 may enter a low power mode.

Figure 2:
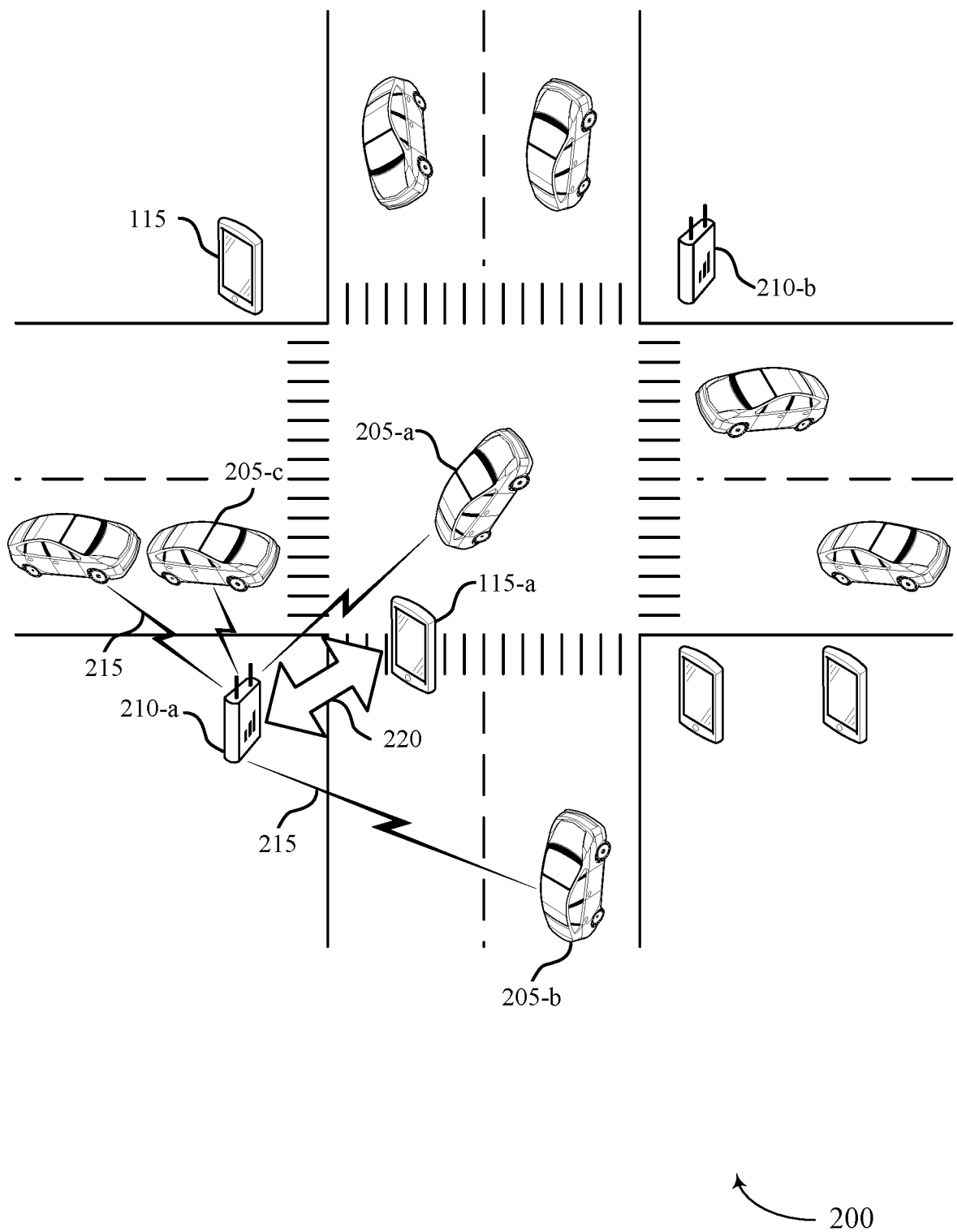
FIG. 2 illustrates an example of a wireless communications system that supports power saving for pedestrian UEs in accordance with aspects of the present disclosure.

FIG. 2 illustrates an example of a wireless communications system 200 that supports power saving for pedestrian UEs in accordance with aspects of the present disclosure. In some examples, wireless communications system 200 may implement aspects of wireless communication system 100.

The wireless communications system 200 may be an example of a V2X wireless communications system. The wireless communications system 200 may include devices which may wirelessly communicate with each other. For example, pedestrian UEs, such as UEs 115 or P-UEs 115, may communicate with other UEs 115, such as vehicles or V-UEs 205. As shown, V-UEs 205 may each include a wireless communications device that enables the V-UEs 205 to communicate with each other, with a base station 105, with P-UEs 115, with other wireless devices (e.g., RSUs 210), or any combination thereof. In some cases, a reference to a V-UE 205 may refer to a wireless communications device integrated into the V-UE 205. A P-UE 115 may communicate with other P-UEs 115, with V-UEs 205, with a base station 105, or with other wireless devices (e.g., RSUs 210).

In some V2X wireless communications systems, a P-UE 115 may receive V2X messages from V2X devices. The V2X devices may send, for example, environment information or traffic warnings to the P-UE 115. The traffic warnings may indicate a possible collision or approaching vehicle, which may be a safety feature for pedestrians and P-UEs 115 in the V2X system. In some examples of these systems, the P-UE 115 may receive V2X messages from each neighboring V-UE 205. For example, P-UE 115-a may receive V2X messages from V-UE 205-a, V-UE 205-b, and V-UE 205-c. P-UE 115-a may monitor for messages from each of the nearby V-UEs 205. Monitoring for messages from each of the nearby devices may consume significant power at a P-UE 115 and prevent the P-UE 115 from entering a lower power state.

Techniques applied in wireless communications systems described herein, such as the wireless communications system 200, may support power saving for P-UEs 115. For example, the wireless communications system 200 may support bundling V2X messages from multiple devices (e.g., multiple V-UEs 205) and sending the bundled or aggregated messages to a P-UE 115 in a single transmission. This may reduce the amount of time that a P-UE 115 spends awake to monitor for and receive V2X messages from multiple different devices. In some cases, bundling messages as described herein may reduce the number of messages the P-UE 115 receives, which may also save on packet processing and security handling. In some cases, the bundled or aggregated V2X messages may be combined, or a transmitting device may send a reduced set of information from the bundled or aggregated V2X messages, which may reduce a message size for the P-UE 115.

In some cases, the V2X messages may be aggregated and bundled by a UE 115. For example, an RSU 210 may receive V2X messages from other devices in the V2X wireless communications system, such as V-UEs 205. For example, the RSU 210 may receive V2X messages from V-UEs 205 over a communication link 215. A P-UE 115 may then receive a single transmission from the RSU 210. For example, the RSU and P-UE 115-a may communicate over an RSU wireless communications link 220. The RSU 210 may be an example of a UE 115 as described with reference to FIG. 1. In some examples, the wireless communications system 200 may include one or more RSUs 210. In some cases, an RSU 210 may also be an example of a P-UE 115, a V-UE 205, or a base station 105, configured to perform features of an RSU as further described herein.

In some cases, a P-UE 115 may not be able to process V2X messages. For example, the P-UE 115 may have a limited set of capabilities, or the P-UE 115 may operate in a mode where the P-UE 115 does not process V2X messages to conserve power. In these examples, the RSU 210 may send a notification indication to the P-UE 115. The notification indication may include a limited set of information for a bundled or aggregated set of V2X messages. For example, the notification indication may include warning messages, etc. Therefore, in some cases, instead of transmitting multiple bundled or aggregated V2X messages to the P-UE 115, the RSU 210 may send an indication of the bundled or aggregated V2X messages, and the indication may include a reduced set of information from the bundled or aggregated V2X messages. In some cases, the indication may include high priority V2X information, and the RSU 210 may drop other, lower priority information for the transmission to the P-UE 115.

In some examples, the P-UE 115 may be capable of processing V2X inputs. In this example, the RSU 210 may aggregate V2X message and environment information into fewer transmission (e.g., into one transmission). In this example, the RSU 210 may bundle the V2X messages from the other V2X devices (e.g., V-UEs 205) and send a single transmission to the P-UE 115. Bundling the V2X messages may reduce the amount of time the P-UE 115 may spend monitoring for each of the V2X messages individually from the different V2X devices. This may reduce power consumption for receiving at the P-UE 115 and reduce power consumption for message handling at the P-UE 115.

In some cases, an RSU 210 may detect environment information based on one or more sensors at the RSU 210. For example, the RSU 210 may include one or more cameras. Using the cameras, the RSU 210 may determine whether to transmit a notification to a P-UE 115. For example, the RSU 210 may determine that the P-UE 115 is on a trajectory to collide with a V-UE 205, and the RSU 210 may send a notification to the P-UE 115. In some examples, such as cases where the RSU 210 obtains information via sensors, the RSU 210 may operate independently of transmission operation at the P-UE 115.

The RSU 210 may transmit the message to the P-UE 115 with a messaging frequency (e.g., consistent with a wake/sleep schedule for P-UE-115). For example, the messaging frequency may be 100 to 200 milliseconds, which may ensure that messages are transmitted frequently enough that the P-UE 115 does not have a significant relative position change (e.g., based on a movement rate, such as a typical movement rate, of P-UEs 115). For example, messages indicating bundled or aggregated V2X messages may be transmitted to the P-UE 115 at a rate such that the P-UE 115 may have traveled within approximately 25 centimeters since the last message occasion.

The wireless communications system 200 may further support techniques for discovery of an RSU 210 at a P-UE 115. In some cases, once the P-UE 115 discovers the RSU 210 and identifies a timing occasion for the RSU 210 to transmit information for the bundled or aggregated V2X messages, the P-UE 115 may enter a low power state. The P-UE 115 may then, in some cases, enter a higher power state and monitor for the transmission from the RSU 210 at the corresponding occasions. Once the message from the RSU 210 is received, or a transmission opportunity for the message has passed, the P-UE 115 may enter the low power state again.

An RSU discovery procedure may, in some cases, be based on announcements or broadcasts from an RSU 210. An example of a discovery procedure initiated by an RSU 210 may be described in more detail with reference to FIG. 3. There may be multiple RSUs 210 in the wireless communications system 200. In some cases, each RSU 210 may announce its presence or an identifier (e.g., an RSU ID), or both. For example, RSU 210-a may broadcast an identifier which distinguishes RSU 210-a from, for example, RSU 210-b. P-UE 115-a may receive the announcement from RSU 210-a, identify RSU 210-a, and associate with RSU 210-a. In some cases, P-UE 115-a may then determine that a power-saving mode may be enabled at P-UE 115-a.

If P-UE 115-a identifies multiple RSUs 210, then P-UE 115-a may determine which RSU 210 is appropriate to use. For example, P-UE 115-a may identify RSU 210-a and RSU 210-b. P-UE 115-a may associate with RSU 210-a, as P-UE 115-a may be in closer proximity to RSU 210-a than RSU 210-b. In some cases, if P-UE 115-a was previously associated with a different RSU 210, then P-UE 115-a may update or change association to RSU 210-a.

In some cases, the announcement from an RSU 210 may include an RSU identifier, an RSU status, position information for the RSU 210, transmission scheduling information, capability information, and connection establishing settings, or any combination thereof. In some cases, the RSU identifier may be a Layer 2 identifier. In some examples, an RSU status may indicate whether the RSU is a permanent RSU or operating as a temporary RSU. In some examples, the transmission scheduling information may indicate radio resource identifiers which the RSU 210 may use to transmit bundled, or aggregated, V2X messages or information associated with bundled, or aggregated, V2X messages. The capability information may indicate what information the RSU 210 is capable of transmitting. For example, the RSU 210 may indicate support for transmitting a bundle of V2X messages, or the RSU 210 may indicate support for transmitting a subset of information (e.g., high priority information) from an bundled or aggregated set of V2X messages. In some cases, the connection establishing settings may include an identifier for radio resources used to access request to the RSU 210.

In some examples, a P-UE 115 may be pre-configured with RSU presence announcement resources. For example, P-UE 115-*a* may have stored, for example in memory, an indicator for resources that RSU 210-*a* may use to announce an identifier as part of the RSU discovery procedure. P-UE 115-*a* may then monitor those pre-configured resources to discover RSU 210-*a* and perform the discovery procedure. In some cases, a P-UE 115 may assume there are many RSUs 210 in the wireless communications system (e.g., at each intersection of a road), and the P-UE 115 may only enable reception when searching for the presence of an RSU. In some other examples, the P-UE 115 may not assume there is a nearby RSU 210, and the P-UE 115 may only search for RSUs 210 when indicated that there is at least one RSU 210 nearby. For example, the P-UE 115 may monitor for all V2X messages until determining that there is an accessible RSU 210.

In some cases, announcements (e.g., or other discovery procedure signaling) may be transmitted for V2X devices (e.g., on a discovery channel). For example, an RSU 210 may transmit an identifier, status, etc., on a discovery channel, and a P-UE 115 may monitor for the identifier on the discovery channel. In some examples, the discovery channel code may have 184 bits using two resource blocks (e.g., message type 4 and a message integrity code of 32 bits).

Some examples of a discovery procedure may be initiated by a P-UE 115. An example of a discovery procedure initiated by the P-UE 115 may be described in more detail with reference to FIG. 4. For example, instead of an RSU 210 broadcasting discovery signals, a P-UE 115 may broadcast (e.g., announce) its presence. In the announcement, the P-UE 115 may indicate a presence of the P-UE 115, an identifier, a speed, direction, a projected path, among other information, or any combination thereof.

In some cases, the P-UE 115 may indicate a receive schedule. The P-UE may monitor radio resource (e.g., power on to monitor the radio resources) as indicated by the receive schedule. An RSU 210 may receive an announcement from a P-UE 115 and determine to serve the P-UE 115. The RSU 210 may contact the P-UE 115 during the indicated resources. For example, the RSU 210 may identify resources during which the P-UE 115 may be on and monitoring, and the RSU 210 may transmit a message indicating to serve the P-UE 115 during the identified resources. The P-UE 115 may turn on a power saving mode after receiving the indication from the RSU 210. In some cases, the RSU 210 may also indicate the detection or tracking of the P-UE 115. In some examples, the RSU 210 may transmit on behalf of the P-UE 115, such that the P-UE 115 may refrain from transmitting while served by the RSU 210.

In some cases, multiple RSUs 210 may receive the announcement from the P-UE 115. In some cases, the RSUs 210 may communicate and determine which of the multiple RSUs 210 serves the P-UE 115. In some other examples, the multiple RSUs 210 may send indications to the P-UE 115, and the P-UE 115 may select an RSU 210 from the multiple RSUs 210. The P-UE 115 may then receive the message indicating bundled or aggregated information from the selected RSU 210.

A P-UE 115 and an RSU 210 may negotiate operation of the P-UE 115. For example, there may be at least three different operation modes. In a first example, the P-UE 115 may broadcast a V2X message (e.g., including location, speed, and direction). The RSU 210 may process the message and other V2X messages, camera inputs, sensor inputs, etc. The RSU 210 may send a warning message to the P-UE 115 if the P-UE 115 may be affected by V-UEs 205 or other environmental factors. In a second example, the P-UE 115 may broadcast a discontinuous reception schedule, and the RSU 210 may aggregate information (e.g., V2X messages, sensors information, camera information, etc.) and send the bundled or aggregated information to the P-UE 115. In a third example, the RSU 210 may broadcast fused sensor information at a fixed schedule, and all P-UEs 115 may receive the message based on an announced transmission schedule for the RSU 210. Fused sensor information may come from one or more sensors at the RSU 210 (e.g., a camera, a proximity sensor, etc.) or other RSUs 210.

For the first and second examples, the RSU 210 may send warnings and bundled or aggregated information via a unicast channel. For the third example, the RSU 210 may send the indication of the bundled or aggregated V2X information via a groupcast channel.

In some cases, for the first and second examples, regardless of the discovery procedure, the P-UE 115 (or RSU 210) may initiate interaction to confirm that the RSU 210 may serve, or help, the P-UE 115. For example, after a P-UE 115 detects an announcement from an RSU 210, the P-UE 115 may verify that the RSU 210 is to send an indication of bundled or aggregated messages to the P-UE 115. In some cases, either the P-UE 115 or the RSU 210 may initiate the verification. Once verified that the RSU 210 will transmit an indication based on the bundled or aggregated V2X information, the P-UE 115 may enter a low power state and exit the low power state to receive transmissions from the RSU 210. In some cases, if unicast transmission is used, an authentication procedure may be used to verify the RSU identity and authorization.

Figure 3:
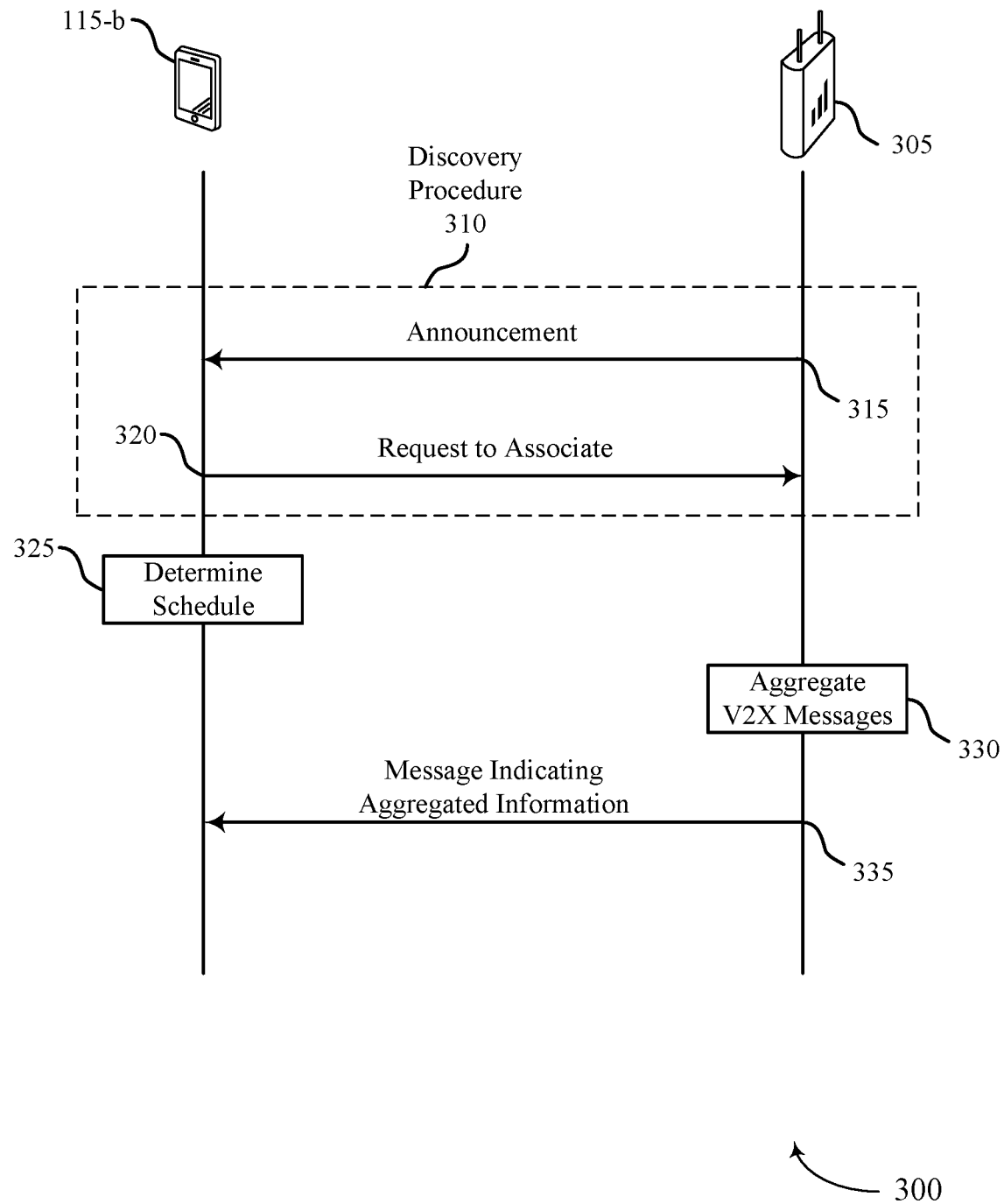
FIG. 3 illustrates an example of a process flow that supports power saving for pedestrian UEs in accordance with aspects of the present disclosure.

FIG. 3 illustrates an example of a process flow 300 that supports power saving for pedestrian UEs in accordance with aspects of the present disclosure. In some examples, process flow 300 may implement aspects of wireless communication system 100. Process flow 300 may be implemented by UE 115-*b* or RSU 305, or both. UE 115-*b* may be an example of a pedestrian UE or a UE 115 as described with reference to FIG. 1. RSU 305 may be an example of an RSU 210 described with reference to FIG. 2 or a UE 115 or a base station 105 as described with reference to FIGS. 1 and 2.

UE 115-*b* and the RSU 305 may perform a discovery procedure 310 in a V2X wireless communications environment that includes multiple UEs 115 in addition to UE 115-*b* and the RSU 305. In some cases, the multiple UEs 115 may, for example, be V-UEs such as a V-UE 205 as described with reference to FIG. 2. The discovery procedure 310 may be an example of an RSU-initiated discovery procedure.

For example, at 315, the RSU 305 may transmit, on a discovery channel, an announcement indicating discovery information for the RSU 305. UE 115-*b* may receive, on the discovery channel, the announcement indicating the discovery information. At 320, UE 115-*b* may transmit, to the RSU 305, a request to associate with the RSU 305 based on the received announcement. In some cases, UE 115-*b* may verify that the RSU 305 can aggregate V2X messages for UE 115-*b* and transmit V2X information for UE 115-*b* in a single transmission prior to entering a low power state.

In some cases, the announcement from the RSU 305 may include an identifier for the RSU 305, a permanency status (e.g., whether the RSU 305 is a permanent RSU or a temporary RSU), a position identifier, a transmission schedule, a transmission capability, at least one connection establishment setting, or a combination thereof. In some cases, UE 115-*b* may transmit the request to associate with the RSU 305 based on the at least one connection establishment setting.

Once the discovery procedure is performed, UE 115-*b* may, in some cases, enter a low power state. UE 115-*b* may determine, based on performing the discovery procedure, a schedule for UE 115-*b* to use to receive bundled or aggregated V2X messages from the RSU 305. For example, UE 115-*b* may enter a low power state and remain in the low power state except to receive the bundled or aggregated V2X messages from the RSU 305. The RSU 305 may determine, at 325, based on performing the discovery procedure, the schedule for UE 115-*b* to receive the bundled or aggregated V2X messages. In some cases, UE 115-*b* may identify the schedule to use to receive bundled or aggregated V2X messages based on the announcement from the RSU 305 (e.g., based on the indicated transmission schedule of the RSU 305).

At 330, the RSU 305 may aggregate a set of V2X messages. The V2X messages may be received from the multiple other UEs 115 in the V2X wireless communications environment (e.g., from V-UEs). At 335, the RSU 305 may transmit, to UE 115-*b*, a message indicating bundled or aggregated information from the set of V2X messages. UE 115-*b* may receive, from the RSU 305, the message indicating bundled or aggregated information from the set of V2X messages received at the RSU 305 from the multiple UEs. In some cases, once UE 115-*b* has received the V2X messages from the RSU 305, UE 115-*b* may enter a low power state.

In some cases, UE 115-*b* may receive, from the RSU 305, a notification of the bundled or aggregated information, where the RSU 305 has processed the set of V2X messages to generate the bundled or aggregated information of the notification. In some examples, UE 115-*b* may not be capable of processing V2X messages, so the RSU 305 may process the V2X messages and just transmit the bundled or aggregated information of the notification. For example, the bundled or aggregated information may not include all information of all of the V2X messages. In some cases, the bundled or aggregated information may include high priority information from the set of V2X messages.

In another example, UE 115-*b* may receive the message from the RSU 305, the message including an aggregation of the set of V2X messages. For example, UE 115-*b* may be capable of processing V2X messages, and the message from the RSU 305 may include each of the aggregated V2X messages from other V2X devices.

Figure 4:
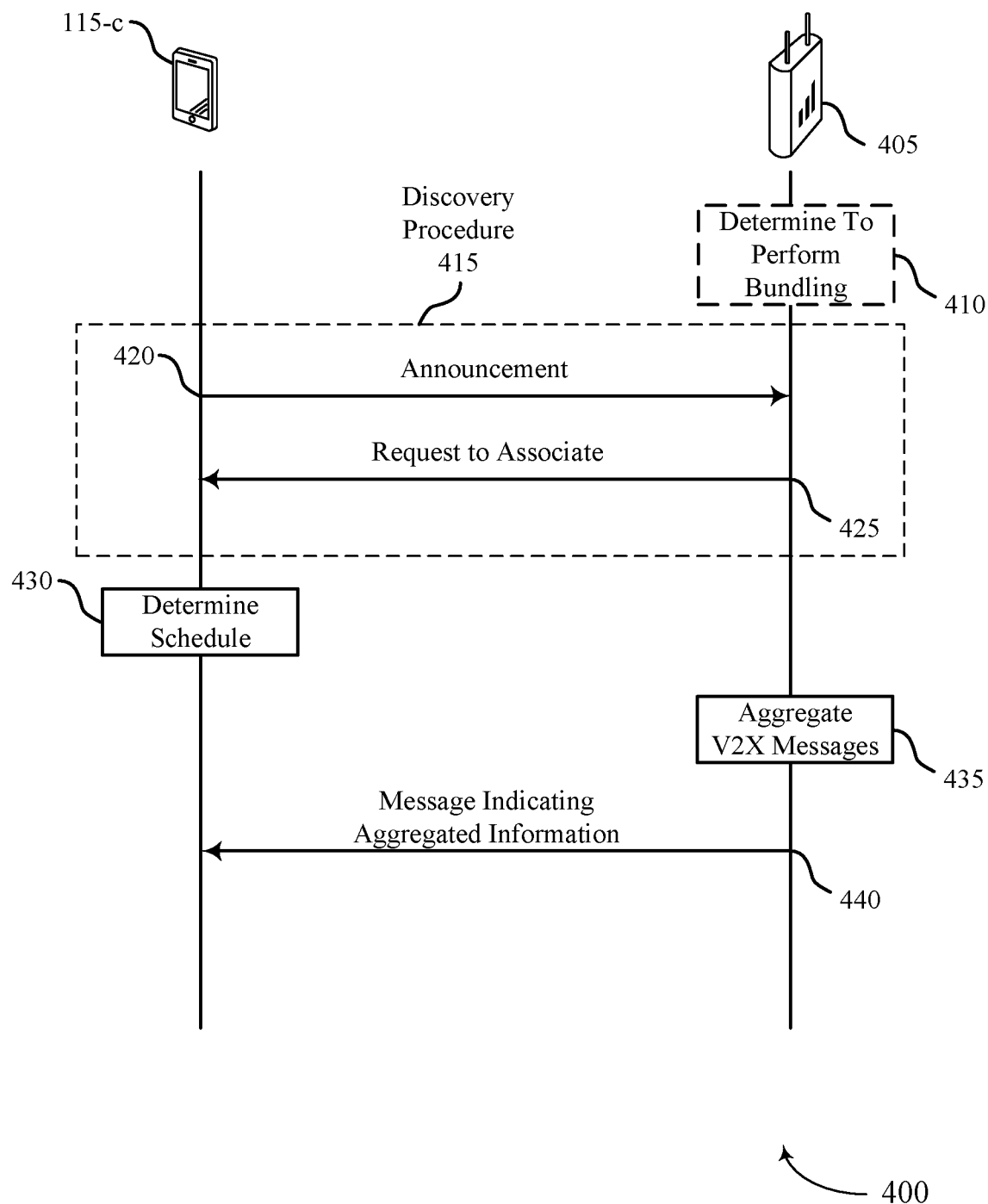
FIG. 4 illustrates an example of a process flow that supports power saving for pedestrian UEs in accordance with aspects of the present disclosure.

FIG. 4 illustrates an example of a process flow 400 that supports power saving for pedestrian UEs in accordance with aspects of the present disclosure. In some examples, process flow 400 may implement aspects of wireless communication system 100.

Process flow 400 may be implemented by UE 115-*c* or an RSU 405, or both. UE 115-*c* may be an example of a pedestrian UE or a UE 115 as described with reference to FIG. 1. The RSU 405 may be an example of an RSU 210 described with reference to FIG. 2 or a UE 115 as described with reference to FIG. 1.

In some cases, at 410, the RSU 405 may identify an absence of UEs 115 having a capability to bundle V2X messages from multiple UEs 115 in a V2X wireless communications environment. The RSU 405 may determine for the RSU 405 to perform bundling of V2X messages for the multiple UEs 115 based on the identifying. For example, there may not be an active RSU in the V2X wireless communications environment, so the RSU 405 may behave as an RSU. For example, the RSU 405 may be an example of a V-UE, a base station 105, a UE 115, or another wireless device, that behaves (e.g., temporarily) as an RSU.

UE 115-*c* and the RSU 405 may perform a discovery procedure 415 in a V2X wireless communications environment that includes multiple UEs in addition to UE 115-*c* and the RSU 405. In some cases, the multiple UEs may, for example, be V-UEs such as a V-UE 205 as described with reference to FIG. 2. The discovery procedure 415 may be an example of a pedestrian UE-initiated discovery procedure.

For example, at 420, UE 115-*c* may transmit (e.g., on a discovery channel) an announcement indicating a schedule that UE 115-*c* is to use to receive bundled or aggregated V2X messages. The RSU 405 may receive the announcement indicating the schedule and transmit, to UE 115-*c* at 425 in response to the received announcement, a signal indicating that the RSU 405 will associate with UE 115-*c*. UE 115-*c* may receive the signal indicating that RSU 405 will associate with UE 115-*c*. In some cases, the announcement from UE 115-*c* may include an identifier for UE 115-*b*, a speed, a direction, a projected path, an indicator of the schedule, or a combination thereof.

At 430, UE 115-*c* may determine, based on performing the discovery procedure, a schedule for UE 115-*c* to use to receive bundled or aggregated V2X messages from the RSU 405. In some cases, the schedule may be based on the scheduled indicated in the announcement at 420.

In some examples, once the discovery procedure is performed, UE 115-*b* may enter a low power state. UE 115-*c* may leave the low power state to receive bundled or aggregated information from the RSU 405 based on the schedule. In some cases, UE 115-*c* may verify that the RSU 405 can aggregate V2X messages for UE 115-*c* and transmit V2X information for UE 115-*c* in a single transmission prior to entering a low power state.

At 435, the RSU 405 may aggregate a set of V2X messages. The V2X messages may be received from the multiple other UEs 115 in the V2X wireless communications environment (e.g., from V-UEs). At 440, the RSU 405 may transmit, to UE 115-*c* according to the determined schedule, a message indicating bundled or aggregated information from the set of V2X messages. UE 115-*c* may receive, from the RSU 405, the message indicating bundled or aggregated information from the set of V2X messages received at the RSU 405 from the multiple UEs. In some cases, once UE 115-*c* has received the V2X messages from the RSU 405, UE 115-*c* may enter a low power state.

In some cases, UE 115-*c* may receive, from the RSU 405, a notification of the bundled or aggregated information, where the RSU 405 has processed the set of V2X messages to generate the bundled or aggregated information of the notification. In some examples, UE 115-*c* may not be capable of processing V2X messages, so the RSU 405 may process the V2X messages and just transmit the bundled or aggregated information of the notification. For example, the bundled or aggregated information may not include all information of all of the V2X messages. In some cases, the bundled or aggregated information may include high priority information from the set of V2X messages.

In another example, UE 115-*c* may receive the message from the RSU 405, the message including an aggregation of the set of V2X messages. For example, UE 115-*c* may be capable of processing V2X messages, and the message from the RSU 405 may include each of the aggregated V2X messages from other V2X devices.

Figure 5:
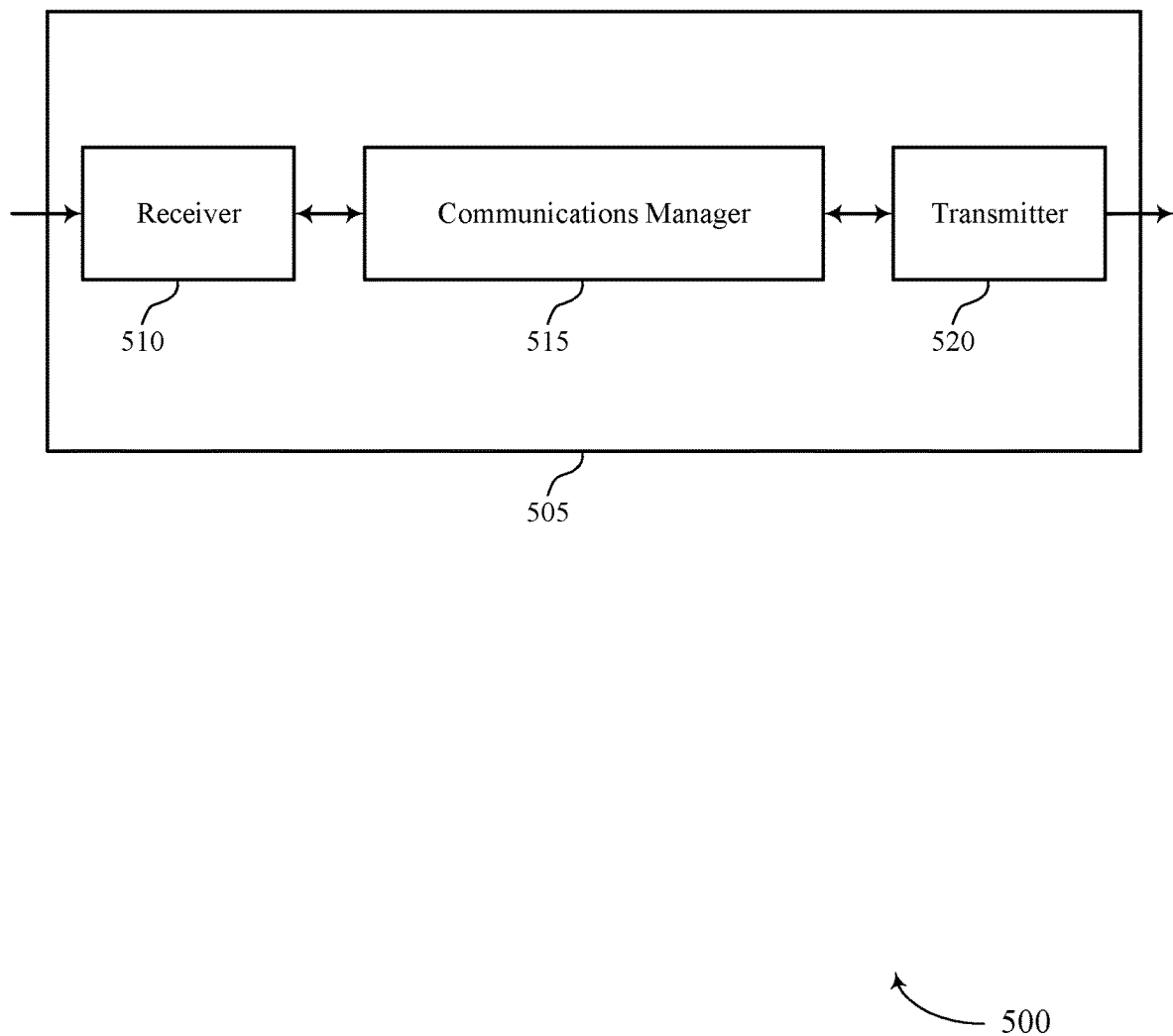
FIGS. 5 and 6 show block diagrams of devices that support power saving for pedestrian UEs in accordance with aspects of the present disclosure.

FIG. 5 shows a block diagram 500 of a device 505 that supports power saving for pedestrian UEs in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to power saving for pedestrian UEs, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may perform, with a second UE, a discovery procedure in a vehicle-to-everything wireless communications environment that includes a set of UEs in addition to the first UE and the second UE, determine, based on performing the discovery procedure, a schedule for the first UE to use to receive bundled or aggregated vehicle-to-everything messages from the second UE, and receive, from the second UE based on the determined schedule, a message indicating bundled or aggregated information from a set of vehicle-to-everything messages received at the second UE from the set of UEs. The communications manager 515 may also perform, with the first UE, a discovery procedure in a vehicle-to-everything wireless communications environment that includes a set of UEs in addition to the first UE and the second UE, determine, based on performing the discovery procedure, a schedule for the first UE to use to receive bundled or aggregated vehicle-to-everything messages, receive a set of vehicle-to-everything messages from the set of UEs, and transmit, to the second UE according to the determined schedule, a message indicating bundled or aggregated information from the set of vehicle-to-everything messages. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a digital signal processor (DSP), an application-specific integrated circuit (ASIC), a fully programmable gate array (FPGA) or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
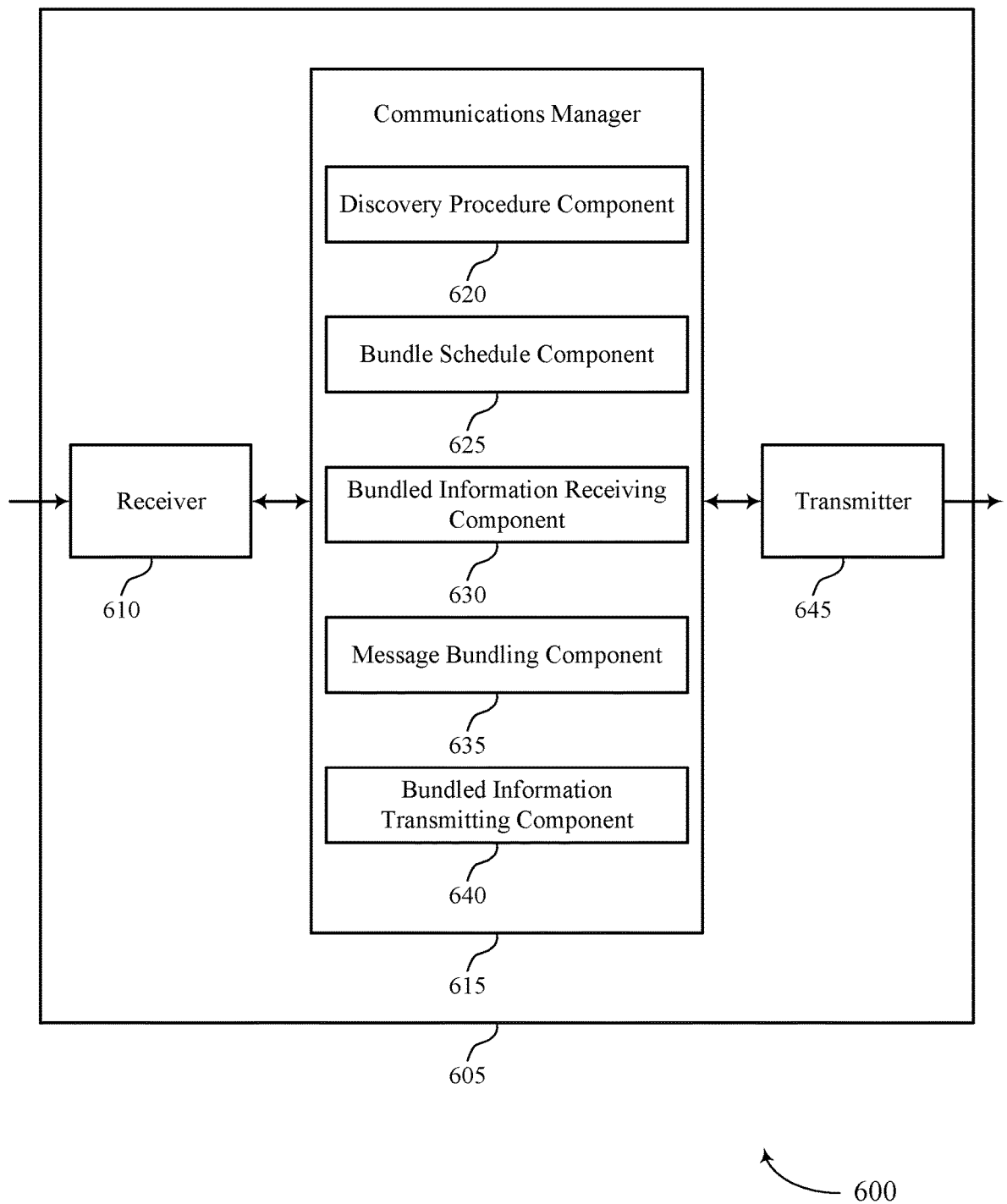

FIG. 6 shows a block diagram 600 of a device 605 that supports power saving for pedestrian UEs in accordance with aspects of the present disclosure. The device 605 may be an example of aspects of a device 505, or a UE 115 as described herein. The device 605 may include a receiver 610, a communications manager 615, and a transmitter 645. The device 605 may also include a processor. Each of these components may be in communication with one another (e.g., via one or more buses).

The receiver 610 may receive information such as packets, user data, or control information associated with various information channels (e.g., control channels, data channels, and information related to power saving for pedestrian UEs, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include a discovery procedure component 620, a bundle schedule component 625, a bundled information receiving component 630, a message bundling component 635, and a bundled information transmitting component 640. The communications manager 615 may be an example of aspects of the communications manager 810 described herein.

The discovery procedure component 620 may perform, with a second UE, a discovery procedure in a vehicle-to-everything wireless communications environment that includes a set of UEs in addition to the first UE and the second UE. The bundle schedule component 625 may determine, based on performing the discovery procedure, a schedule for the first UE to use to receive bundled or aggregated vehicle-to-everything messages from the second UE. The bundled information receiving component 630 may receive, from the second UE based on the determined schedule, a message indicating bundled or aggregated information from a set of vehicle-to-everything messages received at the second UE from the set of UEs.

The discovery procedure component 620 may perform, with the first UE, a discovery procedure in a vehicle-to-everything wireless communications environment that includes a set of UEs in addition to the first UE and the second UE. The bundle schedule component 625 may determine, based on performing the discovery procedure, a schedule for the first UE to use to receive bundled or aggregated vehicle-to-everything messages. The message bundling component 635 may receive a set of vehicle-to-everything messages from the set of UEs. The bundled information transmitting component 640 may transmit, to the second UE according to the determined schedule, a message indicating bundled or aggregated information from the set of vehicle-to-everything messages.

The actions performed by the UE communications manager 615 as described herein may be implemented to realize one or more potential advantages. One implementation may allow a UE 115 to save power and increase battery life by reducing the amount of time the UE 115 spends receiving messages. For example, the UE 115 may instead receive a single transmission from another UE 115 (e.g., an RSU) instead of receiving multiple transmissions from multiple receivers (e.g., multiple V-UEs). Additionally or alternatively, the UE 115 may further reduce power spent on packet processing. For example, the RSU may reduce the number of messages to be processed by the UE 115, which may further increase power savings at the UE 115.

The transmitter 645 may transmit signals generated by other components of the device 605. In some examples, the transmitter 645 may be collocated with a receiver 610 in a transceiver module. For example, the transmitter 645 may be an example of aspects of the transceiver 820 described with reference to FIG. 8. The transmitter 645 may utilize a single antenna or a set of antennas.

Figure 7:
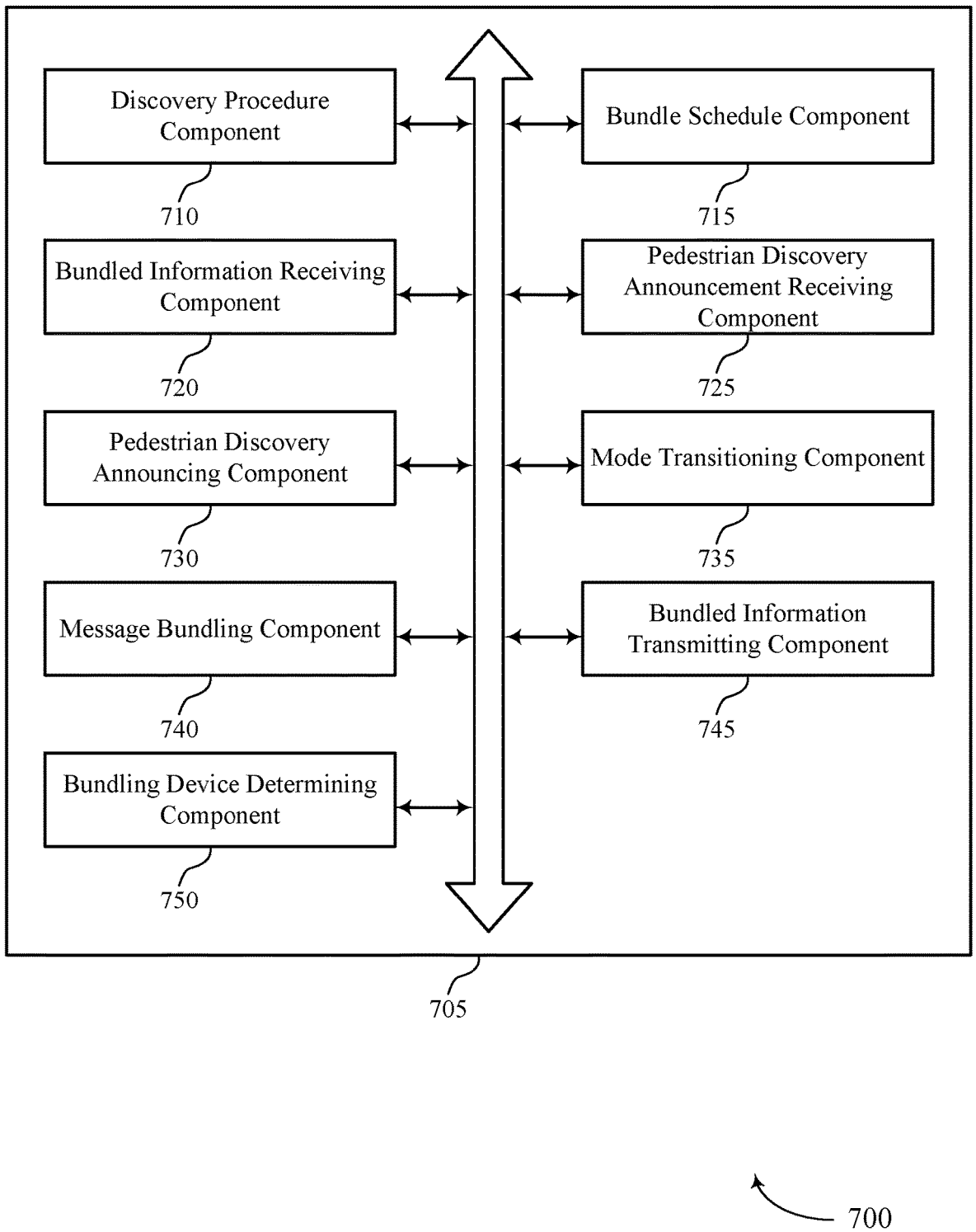
FIG. 7 shows a block diagram of a communications manager that supports power saving for pedestrian UEs in accordance with aspects of the present disclosure.

FIG. 7 shows a block diagram 700 of a communications manager 705 that supports power saving for pedestrian UEs in accordance with aspects of the present disclosure. The communications manager 705 may be an example of aspects of a communications manager 515, a communications manager 615, or a communications manager 810 described herein. The communications manager 705 may include a discovery procedure component 710, a bundle schedule component 715, a bundled information receiving component 720, a pedestrian discovery announcement receiving component 725, a pedestrian discovery announcing component 730, a mode transitioning component 735, a message bundling component 740, a bundled information transmitting component 745, and a bundling device determining component 750. Each of these modules may communicate, directly or indirectly, with one another (e.g., via one or more buses).

The discovery procedure component 710 may perform, with a second UE, a discovery procedure in a vehicle-to-everything wireless communications environment that includes a set of UEs in addition to the first UE and the second UE. In some examples, the discovery procedure component 710 may perform, with the first UE, a discovery procedure in a vehicle-to-everything wireless communications environment that includes a set of UEs in addition to the first UE and the second UE.

In some examples, the discovery procedure component 710 may determine a set of UEs capable of bundling vehicle-to-everything messages from the first UE. In some examples, the discovery procedure component 710 may select the second UE from the set of UEs.

The bundle schedule component 715 may determine, based on performing the discovery procedure, a schedule for the first UE to use to receive bundled or aggregated vehicle-to-everything messages from the second UE. In some examples, the bundle schedule component 715 may determine, based on performing the discovery procedure, a schedule for the first UE to use to receive bundled or aggregated vehicle-to-everything messages.

In some examples, the bundle schedule component 715 may broadcast a discontinuous reception schedule for the first UE, where the message indicating the bundled or aggregated information is received during an awake cycle of the discontinuous reception schedule in response to the broadcast discontinuous reception schedule. In some examples, the bundle schedule component 715 may receive an indication of the schedule from the second UE. In some examples, the bundle schedule component 715 may transmit, to the second UE, an indication of the schedule.

The bundled information receiving component 720 may receive, from the second UE based on the determined schedule, a message indicating bundled or aggregated information from a set of vehicle-to-everything messages received at the second UE from the set of UEs. In some examples, the bundled information receiving component 720 may receive, from the second UE, a notification of the bundled or aggregated information, where the second UE has processed the set of vehicle-to-everything messages to generate the bundled or aggregated information of the notification. In some examples, the bundled information receiving component 720 may receive the message from the second UE, the message including an aggregation of the set of vehicle-to-everything messages. In some cases, the message indicating the bundled or aggregated information is unicast or groupcast.

The message bundling component 740 may receive a set of vehicle-to-everything messages from the set of UEs. In some examples, processing the set of vehicle-to-everything messages to generate the bundled or aggregated information of a notification, where transmitting the message includes indicating the bundled or aggregated information from the set of vehicle-to-everything messages. In some examples, the message bundling component 740 may determine environment information for the second UE using at least one sensor of the second UE, the transmitted message indicating the bundled or aggregated information from the set of vehicle-to-everything messages and the environment information. In some cases, the second UE is included at, or collocated with, a base station 105.

The bundled information transmitting component 745 may transmit, to the second UE according to the determined schedule, a message indicating bundled or aggregated information from the set of vehicle-to-everything messages. In some examples, the bundled information transmitting component 745 may aggregate the set of vehicle-to-everything messages. In some examples, the bundled information transmitting component 745 may transmit, to the first UE, the message including the aggregation of the set of vehicle-to-everything messages. In some cases, the message indicating the bundled or aggregated information is unicast or groupcast.

The pedestrian discovery announcement receiving component 725 may receive, on a discovery channel, an announcement indicating discovery information for the second UE. In some examples, the pedestrian discovery announcement receiving component 725 may transmit, to the second UE, a request to associate with the second UE based on the received announcement. In some examples, the pedestrian discovery announcement receiving component 725 may enter, from a first mode, a second mode based on having determined the schedule, the second mode associated with a lower power than the first mode.

In some examples, the pedestrian discovery announcement receiving component 725 may monitor the discovery channel according to resources dedicated for discovering UEs capable of bundling vehicle-to-everything messages, the announcement received based on the monitoring. In some examples, the pedestrian discovery announcement receiving component 725 may transmit, on a discovery channel, an announcement indicating discovery information for the second UE. In some examples, the pedestrian discovery announcement receiving component 725 may receive, from the first UE, a request to associate with the second UE at least in part in response to the transmitted announcement. In some cases, the announcement includes, for the second UE, an identifier, a permanency status, a position identifier, a transmission schedule, a transmission capability, at least one connection establishment setting, or a combination thereof.

The pedestrian discovery announcing component 730 may transmit an announcement indicating the schedule that the first UE is to use to receive bundled or aggregated vehicle-to-everything messages. In some examples, the pedestrian discovery announcing component 730 may receive, from the second UE at least in part in response to the transmitted announcement, a signal indicating that the second UE will associate with the first UE. In some examples, the pedestrian discovery announcing component 730 may receive an announcement indicating the schedule that the first UE is to use to receive bundled or aggregated vehicle-to-everything messages. In some examples, the pedestrian discovery announcing component 730 may transmit, to the second UE in response to the received announcement, a signal indicating that the second UE will associate with the first UE. In some cases, the announcement includes, for the first UE, an identifier, a speed, a direction, a projected path, an indicator of the schedule, or a combination thereof.

The mode transitioning component 735 may receive vehicle-to-everything messages from at least one of the set of UEs while operating according to a first mode.

In some examples, the mode transitioning component 735 may enter a second mode based on performing the discovery procedure, the second mode associated with a lower power than the first mode. In some examples, the mode transitioning component 735 may identify a set of resources, including at least a transmission cycle, for discovering UEs capable of bundling vehicle-to-everything messages. In some examples, the mode transitioning component 735 may enter, from a first mode, a second mode to monitor for discovery signal of the discovery procedure on the set of resources according to the transmission cycle.

The bundling device determining component 750 may identify an absence of UEs having a capability to bundle vehicle-to-everything messages from the set of UEs. In some examples, the bundling device determining component 750 may determine for the second UE to perform bundling of vehicle-to-everything messages for the set of UEs based on the identifying.

Figure 8:
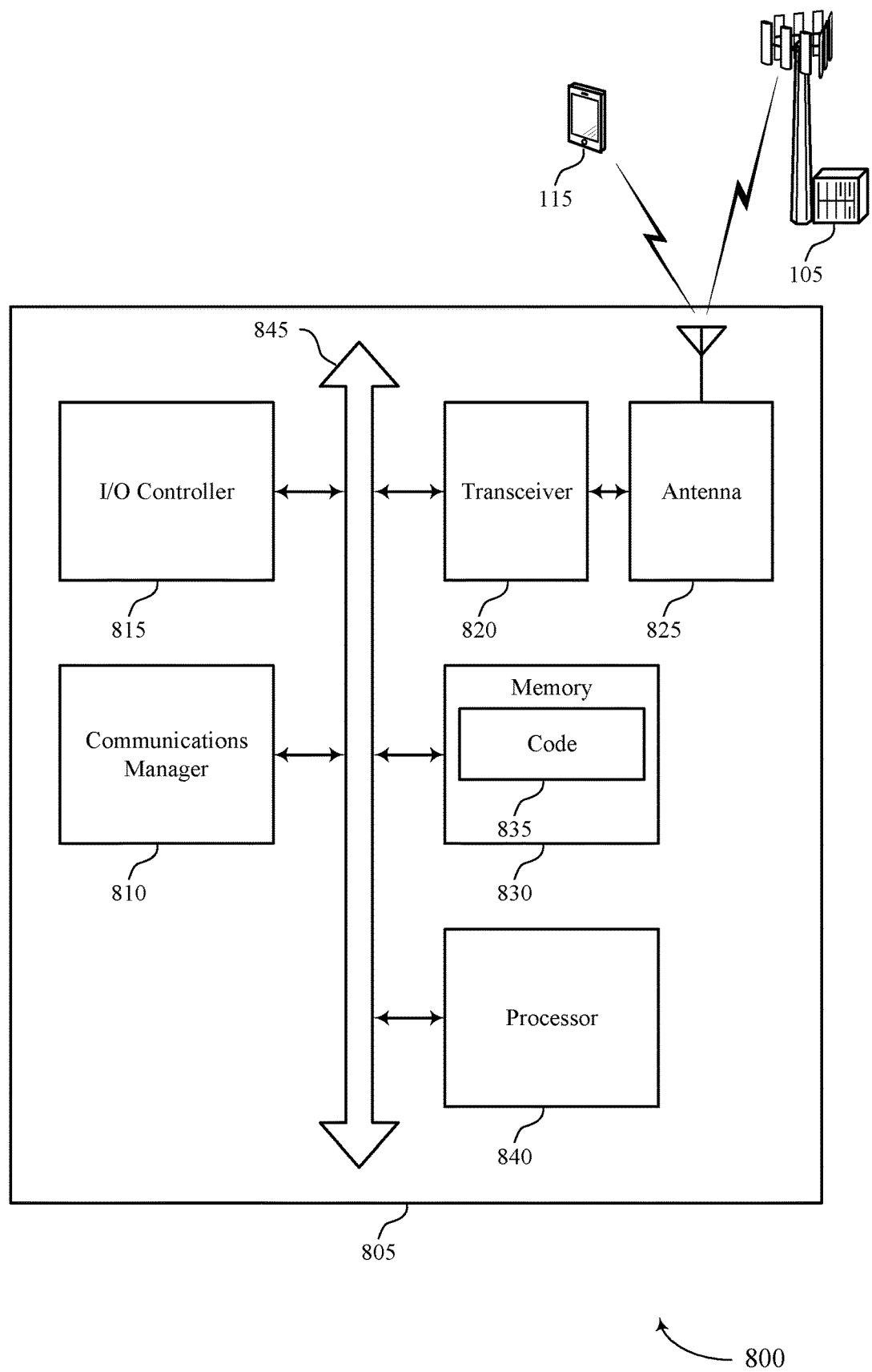
FIG. 8 shows a diagram of a system including a device that supports power saving for pedestrian UEs in accordance with aspects of the present disclosure.

FIG. 8 shows a diagram of a system 800 including a device 805 that supports power saving for pedestrian UEs in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may perform, with a second UE, a discovery procedure in a vehicle-to-everything wireless communications environment that includes a set of UEs in addition to the first UE and the second UE, determine, based on performing the discovery procedure, a schedule for the first UE to use to receive bundled or aggregated vehicle-to-everything messages from the second UE, and receive, from the second UE based on the determined schedule, a message indicating bundled or aggregated information from a set of vehicle-to-everything messages received at the second UE from the set of UEs. The communications manager 810 may also perform, with the first UE, a discovery procedure in a vehicle-to-everything wireless communications environment that includes a set of UEs in addition to the first UE and the second UE, determine, based on performing the discovery procedure, a schedule for the first UE to use to receive bundled or aggregated vehicle-to-everything messages, receive a set of vehicle-to-everything messages from the set of UEs, and transmit, to the second UE according to the determined schedule, a message indicating bundled or aggregated information from the set of vehicle-to-everything messages.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include random-access memory (RAM) and read-only memory (ROM). The memory 830 may store computer-readable, computer-executable code 835 including instructions that, when executed, cause the processor to perform various functions described herein. In some cases, the memory 830 may contain, among other things, a basic input/output system (BIOS) which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting power saving for pedestrian UEs).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Based on remaining in a power saving mode, a processor of a UE 115 (e.g., controlling the receiver 610, the transmitter 645, or the transceiver 820 as described with reference to FIG. 8) may efficiently manage power control for components of the UE 115. For example, when the UE 115 is not receiving a message indicating bundled, or aggregated, transmissions at another UE 115, the UE 115 may remain in a low power state. In this low power state, components such as the receiver 610, the transmitter 645, and the transceiver 820 may be powered off or be in a low power mode. The processor of the UE 115 may turn on one or more processing units for receiving the message indicating bundled or aggregated V2X messages, enable a message processing component, or similar mechanisms within the UE 115 when the UE 115 is to receive the message according to a schedule.

Figure 9:
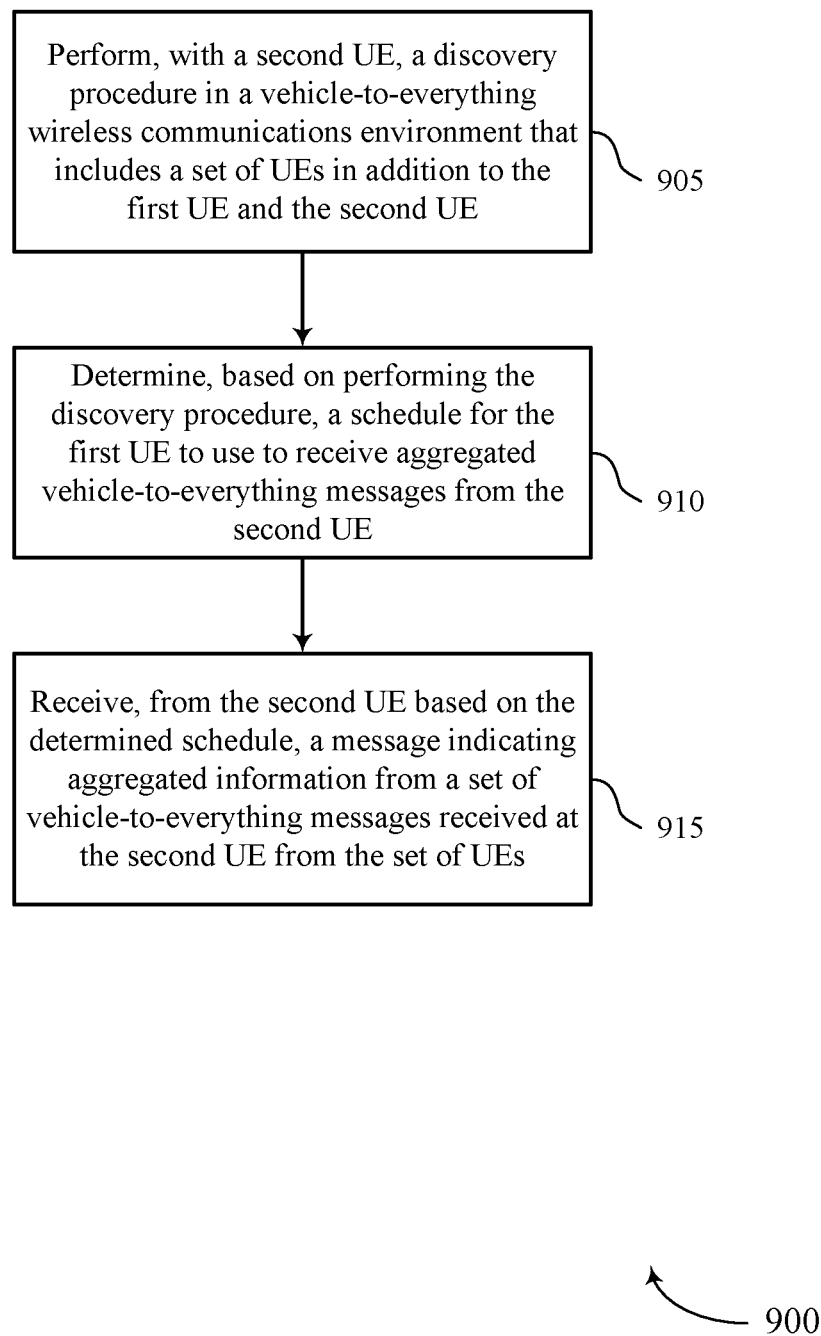
FIGS. 9 through 13 show flowcharts illustrating methods that support power saving for pedestrian UEs in accordance with aspects of the present disclosure.

FIG. 9 shows a flowchart illustrating a method 900 that supports power saving for pedestrian UEs in accordance with aspects of the present disclosure. The operations of method 900 may be implemented by a UE 115 or its components as described herein. For example, the operations of method 900 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 905, the UE may perform, with a second UE, a discovery procedure in a vehicle-to-everything wireless communications environment that includes a set of UEs in addition to the first UE and the second UE. The operations of 905 may be performed according to the methods described herein. In some examples, aspects of the operations of 905 may be performed by a discovery procedure component as described with reference to FIGS. 5 through 8.

At 910, the UE may determine, based on performing the discovery procedure, a schedule for the first UE to use to receive bundled or aggregated vehicle-to-everything messages from the second UE. The operations of 910 may be performed according to the methods described herein. In some examples, aspects of the operations of 910 may be performed by a bundle schedule component as described with reference to FIGS. 5 through 8.

At 915, the UE may receive, from the second UE based on the determined schedule, a message indicating bundled or aggregated information from a set of vehicle-to-everything messages received at the second UE from the set of UEs. The operations of 915 may be performed according to the methods described herein. In some examples, aspects of the operations of 915 may be performed by a bundled or aggregated information receiving component as described with reference to FIGS. 5 through 8.

Figure 10:
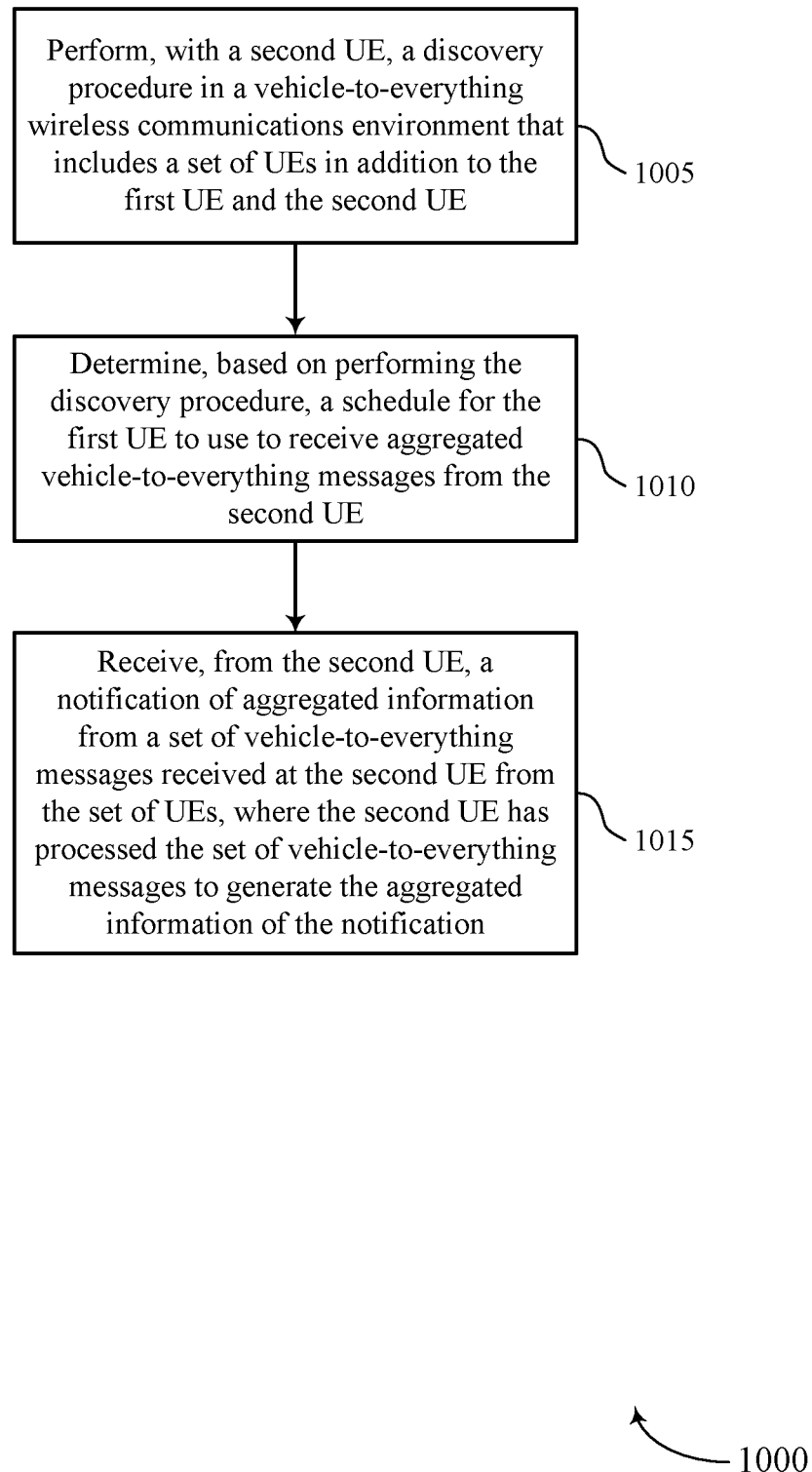

FIG. 10 shows a flowchart illustrating a method 1000 that supports power saving for pedestrian UEs in accordance with aspects of the present disclosure. The operations of method 1000 may be implemented by a UE 115 or its components as described herein. For example, the operations of method 1000 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1005, the UE may perform, with a second UE, a discovery procedure in a vehicle-to-everything wireless communications environment that includes a set of UEs in addition to the first UE and the second UE. The operations of 1005 may be performed according to the methods described herein. In some examples, aspects of the operations of 1005 may be performed by a discovery procedure component as described with reference to FIGS. 5 through 8.

At 1010, the UE may determine, based on performing the discovery procedure, a schedule for the first UE to use to receive bundled or aggregated vehicle-to-everything messages from the second UE. The operations of 1010 may be performed according to the methods described herein. In some examples, aspects of the operations of 1010 may be performed by a bundle schedule component as described with reference to FIGS. 5 through 8.

At 1015, the UE may receive, from the second UE, a notification of bundled or aggregated information from a set of vehicle-to-everything messages received at the second UE from the set of UEs, where the second UE has processed the set of vehicle-to-everything messages to generate the bundled or aggregated information of the notification. The operations of 1015 may be performed according to the methods described herein. In some examples, aspects of the operations of 1015 may be performed by a bundled or aggregated information receiving component as described with reference to FIGS. 5 through 8.

Figure 11:
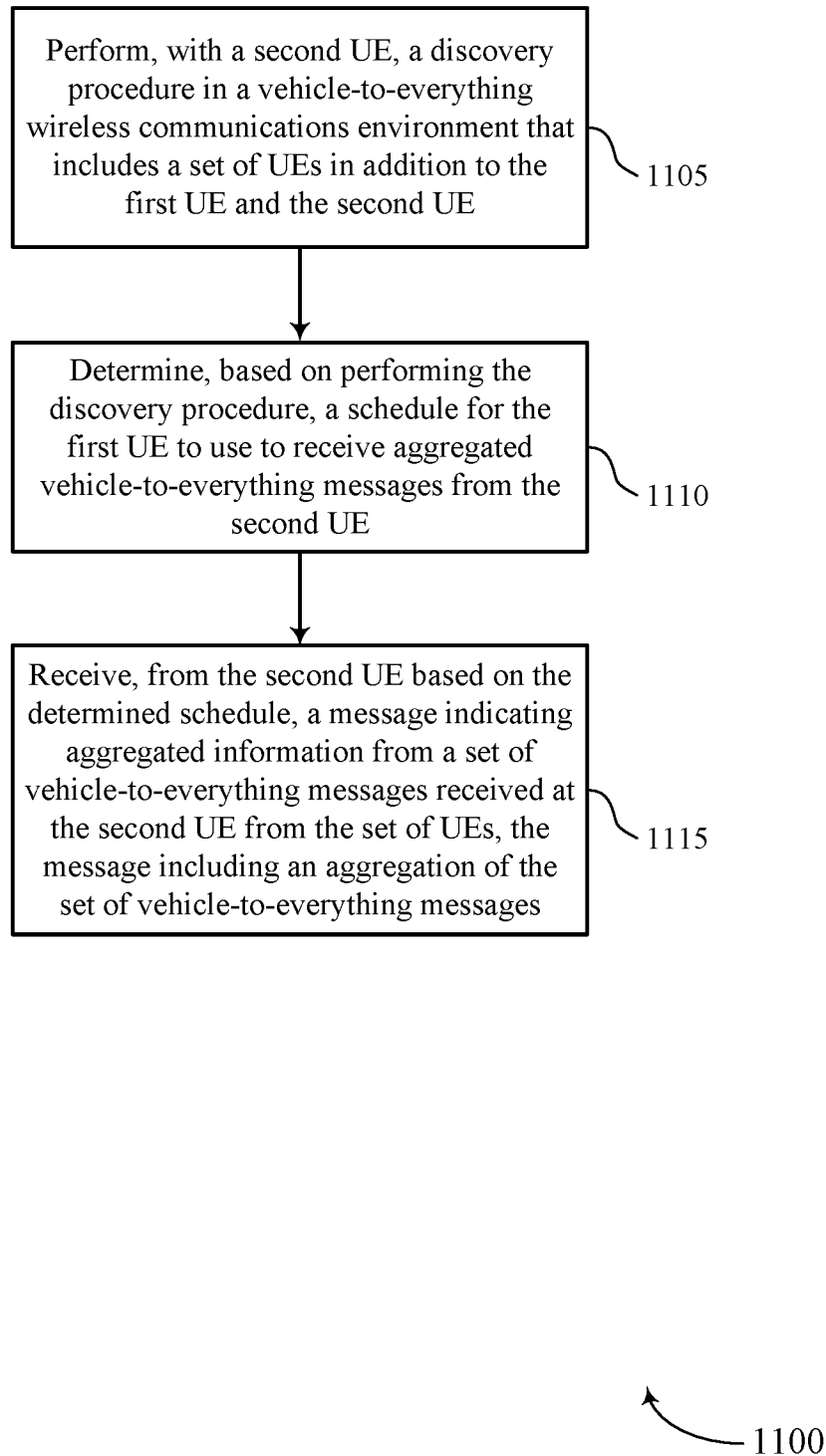

FIG. 11 shows a flowchart illustrating a method 1100 that supports power saving for pedestrian UEs in accordance with aspects of the present disclosure. The operations of method 1100 may be implemented by a UE 115 or its components as described herein. For example, the operations of method 1100 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1105, the UE may perform, with a second UE, a discovery procedure in a vehicle-to-everything wireless communications environment that includes a set of UEs in addition to the first UE and the second UE. The operations of 1105 may be performed according to the methods described herein. In some examples, aspects of the operations of 1105 may be performed by a discovery procedure component as described with reference to FIGS. 5 through 8.

At 1110, the UE may determine, based on performing the discovery procedure, a schedule for the first UE to use to receive bundled or aggregated vehicle-to-everything messages from the second UE. The operations of 1110 may be performed according to the methods described herein. In some examples, aspects of the operations of 1110 may be performed by a bundle schedule component as described with reference to FIGS. 5 through 8.

At 1115, the UE may receive, from the second UE based on the determined schedule, a message indicating bundled or aggregated information from a set of vehicle-to-everything messages received at the second UE from the set of UEs, the message including an aggregation of the set of vehicle-to-everything messages. The operations of 1115 may be performed according to the methods described herein. In some examples, aspects of the operations of 1115 may be performed by a bundled or aggregated information receiving component as described with reference to FIGS. 5 through 8.

Figure 12:
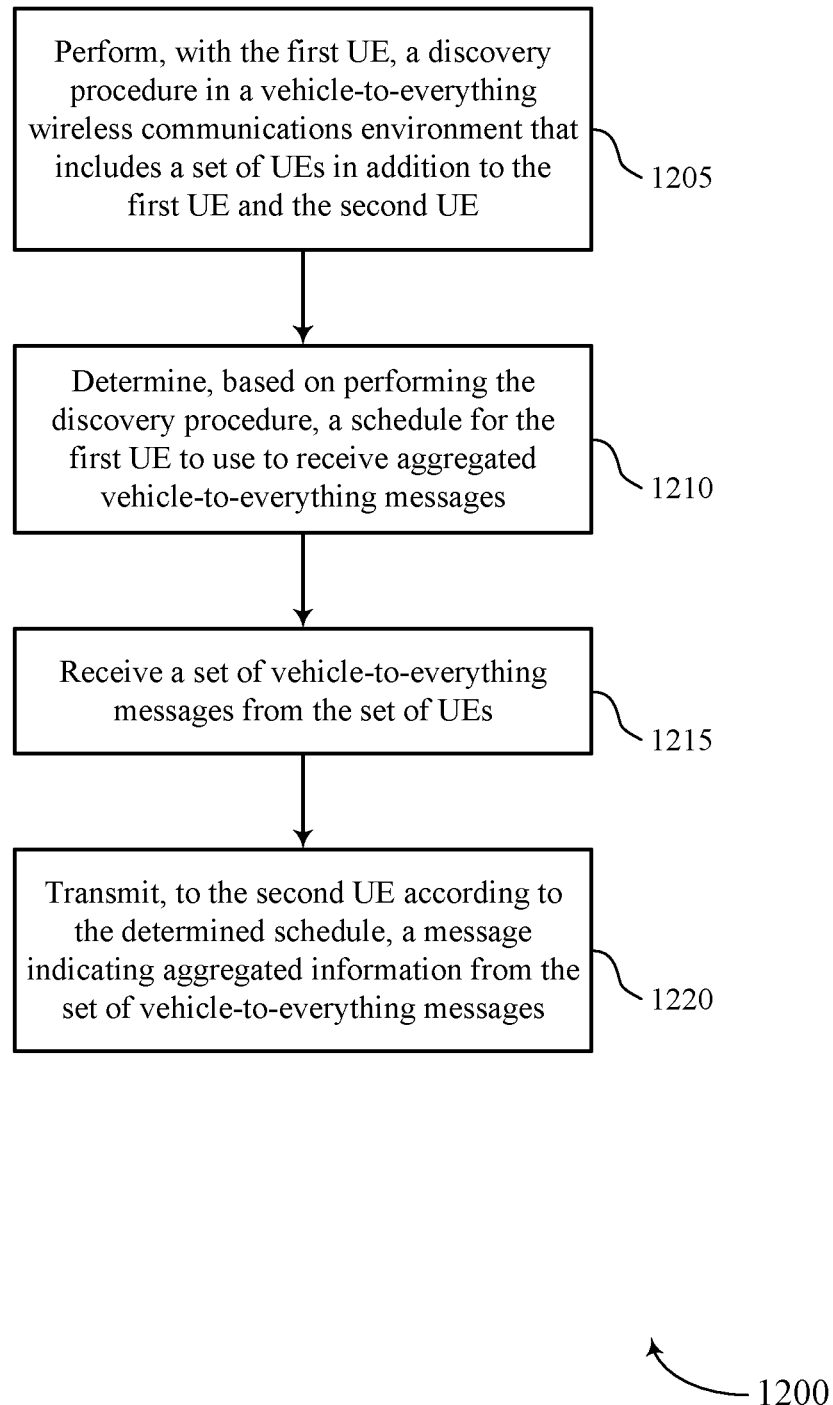

FIG. 12 shows a flowchart illustrating a method 1200 that supports power saving for pedestrian UEs in accordance with aspects of the present disclosure. The operations of method 1200 may be implemented by a UE 115 or its components as described herein. For example, the operations of method 1200 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1205, the UE may perform, with the first UE, a discovery procedure in a vehicle-to-everything wireless communications environment that includes a set of UEs in addition to the first UE and the second UE. The operations of 1205 may be performed according to the methods described herein. In some examples, aspects of the operations of 1205 may be performed by a discovery procedure component as described with reference to FIGS. 5 through 8.

At 1210, the UE may determine, based on performing the discovery procedure, a schedule for the first UE to use to receive bundled or aggregated vehicle-to-everything messages. The operations of 1210 may be performed according to the methods described herein. In some examples, aspects of the operations of 1210 may be performed by a bundle schedule component as described with reference to FIGS. 5 through 8.

At 1215, the UE may receive a set of vehicle-to-everything messages from the set of UEs. The operations of 1215 may be performed according to the methods described herein. In some examples, aspects of the operations of 1215 may be performed by a message bundling component as described with reference to FIGS. 5 through 8.

At 1220, the UE may transmit, to the second UE according to the determined schedule, a message indicating bundled or aggregated information from the set of vehicle-to-everything messages. The operations of 1220 may be performed according to the methods described herein. In some examples, aspects of the operations of 1220 may be performed by a bundled or aggregated information transmitting component as described with reference to FIGS. 5 through 8.

Figure 13:
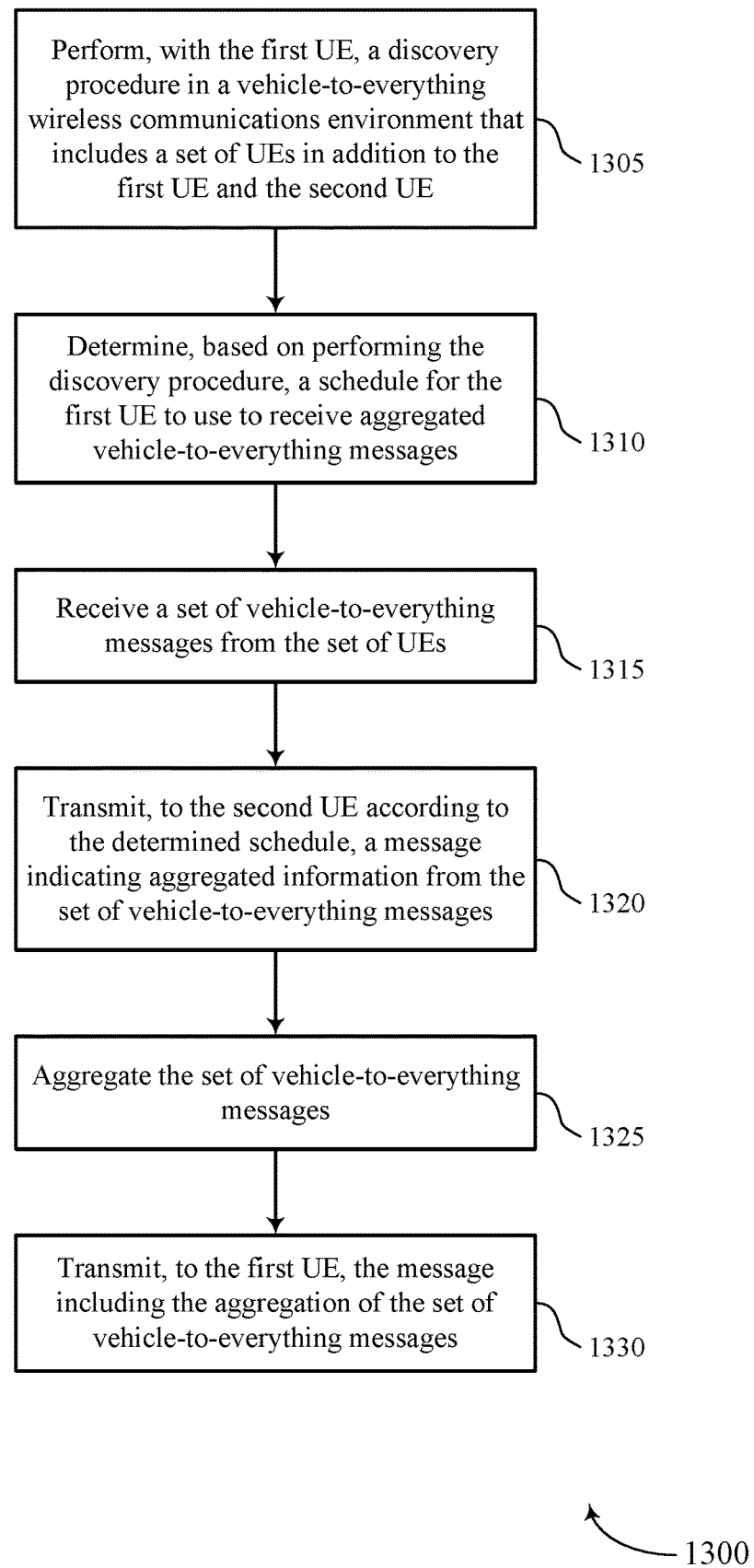

FIG. 13 shows a flowchart illustrating a method 1300 that supports power saving for pedestrian UEs in accordance with aspects of the present disclosure. The operations of method 1300 may be implemented by a UE 115 or its components as described herein. For example, the operations of method 1300 may be performed by a communications manager as described with reference to FIGS. 5 through 8. In some cases, the UE 115 or its components as described herein may be included at, or collocated with, a base station 105. In some examples, a UE may execute a set of instructions to control the functional elements of the UE to perform the functions described below. Additionally or alternatively, a UE may perform aspects of the functions described below using special-purpose hardware.

At 1305, the UE may perform, with the first UE, a discovery procedure in a vehicle-to-everything wireless communications environment that includes a set of UEs in addition to the first UE and the second UE. The operations of 1305 may be performed according to the methods described herein. In some examples, aspects of the operations of 1305 may be performed by a discovery procedure component as described with reference to FIGS. 5 through 8.

At 1310, the UE may determine, based on performing the discovery procedure, a schedule for the first UE to use to receive bundled or aggregated vehicle-to-everything messages. The operations of 1310 may be performed according to the methods described herein. In some examples, aspects of the operations of 1310 may be performed by a bundle schedule component as described with reference to FIGS. 5 through 8.

At 1315, the UE may receive a set of vehicle-to-everything messages from the set of UEs. The operations of 1315 may be performed according to the methods described herein. In some examples, aspects of the operations of 1315 may be performed by a message bundling component as described with reference to FIGS. 5 through 8.

At 1320, the UE may transmit, to the second UE according to the determined schedule, a message indicating bundled or aggregated information from the set of vehicle-to-everything messages. The operations of 1320 may be performed according to the methods described herein. In some examples, aspects of the operations of 1320 may be performed by a bundled or aggregated information transmitting component as described with reference to FIGS. 5 through 8.

At 1325, the UE may aggregate the set of vehicle-to-everything messages. The operations of 1325 may be performed according to the methods described herein. In some examples, aspects of the operations of 1325 may be performed by a bundled or aggregated information transmitting component as described with reference to FIGS. 5 through 8.

At 1330, the UE may transmit, to the first UE, the message including the aggregation of the set of vehicle-to-everything messages. The operations of 1330 may be performed according to the methods described herein. In some examples, aspects of the operations of 1330 may be performed by a bundled or aggregated information transmitting component as described with reference to FIGS. 5 through 8.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a first user equipment (UE), comprising:
performing, with a second UE, a discovery procedure in a vehicle-to-everything wireless communications environment that includes a plurality of UEs in addition to the first UE and the second UE;
determining, based at least in part on performing the discovery procedure, a schedule for the first UE to use to receive aggregated vehicle-to-everything messages from the second UE, the schedule being a time schedule and the aggregated vehicle-to-everything messages being based at least in part on a plurality of vehicle-to-everything messages received at the second UE from the plurality of UEs; and
receiving, from the second UE based at least in part on the determined schedule, at least one or more messages related to the aggregated vehicle-to-everything messages.

2. The method of claim 1, wherein receiving at least the one or more messages comprises:
receiving, from the second UE, a notification of the aggregated information, wherein the second UE has processed the plurality of vehicle-to-everything messages to generate the aggregated information.

3. The method of claim 1, wherein receiving the at least one or more messages comprises:
receiving an aggregation of the plurality of vehicle-to-everything messages.

4. The method of claim 1, wherein performing the discovery procedure with the second UE comprises:
receiving, on a discovery channel, an announcement indicating discovery information for the second UE; and
transmitting, to the second UE, a request to associate with the second UE based at least in part on the received announcement.

5. The method of claim 4, further comprising:
entering, from a first mode, a second mode based at least in part on having determined the schedule, the second mode associated with a lower power than the first mode.

6. The method of claim 4, further comprising:
monitoring the discovery channel according to resources dedicated for discovering UEs capable of bundling vehicle-to-everything messages, the announcement received based at least in part on the monitoring.

7. The method of claim 4, wherein the announcement comprises, for the second UE, an identifier, a permanency status, a position identifier, a transmission schedule, a transmission capability, at least one connection establishment setting, or a combination thereof.

8. The method of claim 1, wherein performing the discovery procedure with the second UE comprises:
transmitting an announcement indicating the schedule that the first UE is to use to receive aggregated vehicle-to-everything messages; and
receiving, from the second UE at least in part in response to the transmitted announcement, a signal indicating that the second UE will associate with the first UE.

9. The method of claim 8, wherein the announcement comprises, for the first UE, an identifier, a speed, a direction, a projected path, an indicator of the schedule, or a combination thereof.

10. The method of claim 1, further comprising:
receiving vehicle-to-everything messages from at least one of the plurality of UEs while operating according to a first mode; and
entering a second mode based at least in part on performing the discovery procedure, the second mode associated with a lower power than the first mode.

11. The method of claim 1, wherein performing the discovery procedure with the second UE further comprises:
determining a set of UEs capable of bundling vehicle-to-everything messages from the first UE; and
selecting the second UE from the set of UEs.

12. The method of claim 1, wherein performing the discovery procedure further comprises:
identifying a set of resources, including at least a transmission cycle, for discovering UEs capable of bundling vehicle-to-everything messages; and
entering, from a first mode, a second mode to monitor for discovery signal of the discovery procedure on the set of resources according to the transmission cycle.

13. The method of claim 1, further comprising:
broadcasting a discontinuous reception schedule for the first UE, wherein the message indicating the aggregated information is received during an awake cycle of the discontinuous reception schedule in response to the broadcast discontinuous reception schedule.

14. The method of claim 1, wherein determining the schedule comprises:
receiving an indication of the schedule from the second UE.

15. The method of claim 1, wherein at least one or more messages comprises a message indicating aggregating information corresponding to the plurality of vehicle-to-everything messages, wherein the message indicating the aggregated information is unicast or groupcast.

16. A method for wireless communications with a first user equipment (UE) at a second UE, comprising:
performing, with the first UE, a discovery procedure in a vehicle-to-everything wireless communications environment that includes a plurality of UEs in addition to the first UE and the second UE;
determining, based at least in part on performing the discovery procedure, a schedule for the first UE to use to receive aggregated vehicle-to-everything messages, the schedule being a time schedule and the aggregated vehicle-to-everything messages being based at least in part on a plurality of vehicle-to-everything messages received at the second UE from the plurality of UEs;
receiving a plurality of vehicle-to-everything messages from the plurality of UEs; and
transmitting, to the first UE according to the determined schedule, at least one or more messages related to the aggregated vehicle-to-everything messages.

17. The method of claim 16, further comprising:
processing the plurality of vehicle-to-everything messages to generate the aggregated information; and
transmitting, to the first UE, a notification of the aggregated information.

18. The method of claim 16, further comprising:
aggregating the plurality of vehicle-to-everything messages; and
transmitting, to the first UE, the message comprising the aggregation of the plurality of vehicle-to-everything messages.

19. The method of claim 16, wherein performing the discovery procedure with the first UE comprises:
transmitting, on a discovery channel, an announcement indicating discovery information for the second UE; and
receiving, from the first UE, a request to associate with the second UE at least in part in response to the transmitted announcement.

20. The method of claim 19, wherein the announcement comprises, for the second UE, an identifier, a permanency status, a position identifier, a transmission schedule, a transmission capability, at least one connection establishment setting, or a combination thereof.

21. The method of claim 16, wherein performing the discovery procedure with the first UE comprises:
receiving an announcement indicating the schedule that the first UE is to use to receive aggregated vehicle-to-everything messages; and
transmitting, to the second UE in response to the received announcement, a signal indicating that the second UE will associate with the first UE.

22. The method of claim 21, wherein the announcement comprises, for the first UE, an identifier, a speed, a direction, a projected path, an indicator of the schedule, or a combination thereof.

23. The method of claim 16, further comprising:
transmitting, to the second UE, an indication of the schedule.

24. The method of claim 16, wherein the message indicating the aggregated information is unicast or groupcast.

25. The method of claim 16, further comprising:
identifying an absence of UEs having a capability to bundle vehicle-to-everything messages from the plurality of UEs; and
determining for the second UE to perform bundling of vehicle-to-everything messages for the plurality of UEs based at least in part on the identifying.

26. The method of claim 16, further comprising:
determining environment information for the second UE using at least one sensor of the second UE, the transmitted message indicating the aggregated information from the plurality of vehicle-to-everything messages and the environment information.

27. The method of claim 16, wherein the second UE is included at a base station.

28. An apparatus for wireless communications at a first user equipment (UE), comprising:
a processor,
memory coupled with the processor; and
instructions stored in the memory and executable by the processor to cause the apparatus to:
perform, with a second UE, a discovery procedure in a vehicle-to-everything wireless communications environment that includes a plurality of UEs in addition to the first UE and the second UE;
determine, based at least in part on performing the discovery procedure, a schedule for the first UE to use to receive aggregated vehicle-to-everything messages from the second UE, the schedule being a time schedule and the aggregated vehicle-to-everything messages being based at least in part on a plurality of vehicle-to-everything messages received at the second UE from the plurality of UEs; and
receive, from the second UE based at least in part on the determined schedule, at least one or more messages related to the aggregated vehicle-to-everything messages.

29. The apparatus of claim 28, wherein the instructions to receive at least the one or more messages are executable by the processor to cause the apparatus to:
receive, from the second UE, a notification of the aggregated information, wherein the second UE has processed the plurality of vehicle-to-everything messages to generate the aggregated information.

30. An apparatus for wireless communications with a first user equipment (UE) at a second UE, comprising:
a processor,
memory coupled with the processor; and
instructions stored in the memory and executable by the processor to cause the apparatus to:
perform, with the first UE, a discovery procedure in a vehicle-to-everything wireless communications environment that includes a plurality of UEs in addition to the first UE and the second UE;
determine, based at least in part on performing the discovery procedure, a schedule for the first UE to use to receive aggregated vehicle-to-everything messages, the schedule being a time schedule and the aggregated vehicle-to-everything messages being based at least in part on a plurality of vehicle-to-everything messages received at the second UE from the plurality of UEs;
receive a plurality of vehicle-to-everything messages from the plurality of UEs; and
transmit, to the second UE according to the determined schedule, at least one or more messages related to the aggregated vehicle-to-everything messages.

* * * * *